US009262683B2

(12) United States Patent
Takeuchi

(10) Patent No.: US 9,262,683 B2
(45) Date of Patent: Feb. 16, 2016

(54) IMAGE PROCESSING DEVICE, IMAGE PROCESSING METHOD, AND PROGRAM

(71) Applicant: Sony Corporation, Tokyo (JP)

(72) Inventor: Hideto Takeuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 85 days.

(21) Appl. No.: 14/086,720

(22) Filed: Nov. 21, 2013

(65) Prior Publication Data

US 2014/0153776 A1 Jun. 5, 2014

(30) Foreign Application Priority Data

Dec. 4, 2012 (JP) ................................. 2012-265725

(51) Int. Cl.
*G06K 9/00* (2006.01)
*G06K 9/32* (2006.01)

(52) U.S. Cl.
CPC .......... *G06K 9/3241* (2013.01); *G06K 9/00785* (2013.01)

(58) Field of Classification Search
CPC ................................................ G06K 9/00812
See application file for complete search history.

(56) References Cited

U.S. PATENT DOCUMENTS

| 7,116,246 | B2 * | 10/2006 | Winter et al. | 340/932.2 |
| 7,218,758 | B2 * | 5/2007 | Ishii | B60R 1/00 340/933 |
| 7,432,799 | B2 * | 10/2008 | Tsuboi | B60Q 9/005 340/425.5 |
| 7,659,835 | B2 * | 2/2010 | Jung | B62D 15/0285 340/932.2 |
| 8,300,889 | B2 * | 10/2012 | Jung | G06T 7/0044 348/169 |
| 8,350,909 | B2 * | 1/2013 | Mori | B60R 1/00 348/143 |
| 9,129,524 | B2 * | 9/2015 | Delibaltov | G06K 9/00785 |
| 2014/0037142 | A1 * | 2/2014 | Bhanu et al. | 382/103 |

FOREIGN PATENT DOCUMENTS

| JP | 09067954 A | * | 3/1997 |
| JP | 10-049662 A | | 2/1998 |

OTHER PUBLICATIONS

Blumer et al., ("Cost-effective single-camera multi-car parking monitoring and vacancy detection towards real-world parking statistics and real-time reporting"), ICONIP 2012, Nov. 12-15, 2012.*
Bhaskar et al., ("Rectangular empty parking space detection using SIFT based classification"), VISAPP 2011.*

(Continued)

*Primary Examiner* — Soo Park
(74) *Attorney, Agent, or Firm* — Wolf, Greenfield & Sacks, P.C.

(57) ABSTRACT

There is provided an image processing device including an image input unit configured to input captured image data of a portion of parking stalls that are compartmented at least by a first side line extending in a first direction and a second side line extending in the first direction, an image processing unit configured to generate edge image data by performing an edge extraction process on the captured image data, and a parking determination unit configured to obtain an integrated value of edge pixels of the first direction portion corresponding to the parking stalls in each position of a second direction that is orthogonal to the first direction based on the edge image data, and then to determine whether or not vehicles are parked in the parking stalls based on the obtained integrated value of each position of the second direction.

11 Claims, 20 Drawing Sheets

(56) References Cited

OTHER PUBLICATIONS

Caklovic et al., ("Managing and monitoring of parking lot by a video camera"), Proc. Of Automation in Transformation 2010.*

Bong et al. ("Integrated approach in the design of car park occupancy information system (COINS)"), IAENG 2008.*

* cited by examiner

FIG. 7
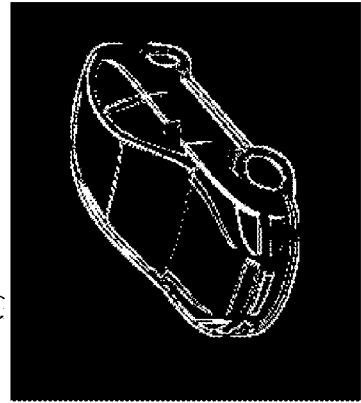
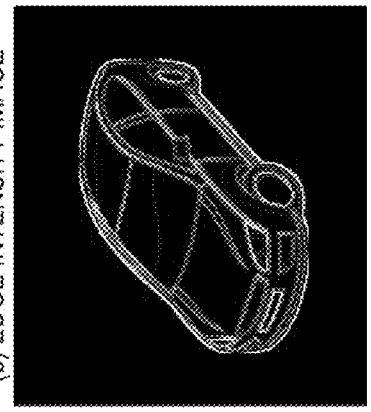
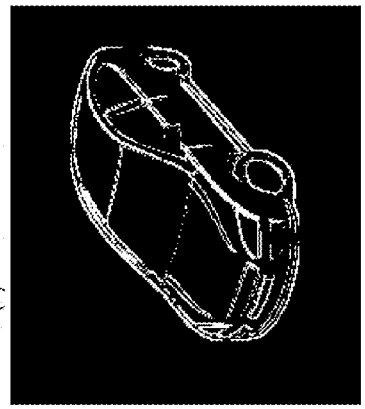
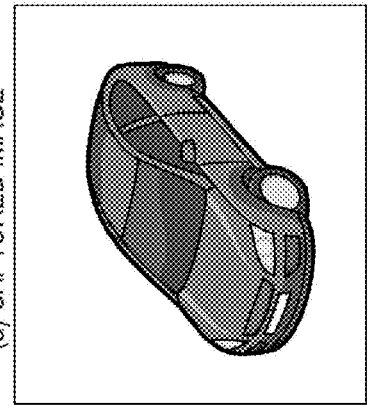

IMAGE PROCESSING DEVICE, IMAGE PROCESSING METHOD, AND PROGRAM

CROSS REFERENCE TO RELATED APPLICATIONS

This application claims the benefit of Japanese Priority Patent Application JP 2012-265725 filed Dec. 4, 2012, the entire contents of which are incorporated herein by reference.

BACKGROUND

The present technology relates to an image processing device, an image processing method, and a program, and particularly to an image processing device, and the like which enable a process of determining whether or not a vehicle is parked in a parking stall based on captured image data.

FIG. 20 shows an example of a captured image of a parking lot such as a service area or a parking area on an expressway. As shown in the drawing, a parking lot includes a plurality of parking lanes and passages disposed between the parking lanes. For such a parking lot, a technology of computing the degree of congestion of vehicles for each parking lane and thereby computing the degree of congestion of the entire parking lot has been considered.

In order to compute the degree of congestion of vehicles in parking lanes, it is necessary to detect parking of a vehicle in each parking stall. For example, a method of installing a physical sensor in each parking stall is considered. However, this method is not reasonable due to a large number of sensors to be installed.

A method for detecting parking of a vehicle in each parking stall using a technique of a background difference which is a general image process has been considered (for example, refer to Japanese Unexamined Patent Application Publication No. 10-049662). However, in a parking lot such as a service area or a parking area of an expressway, entries and exits of vehicles are frequently made at all times, and parking stalls located close to toilets or shops go unoccupied only for extremely short periods of time. For these reasons, it is difficult to detect vehicles using the method.

SUMMARY

It is desirable to be able to satisfactorily determine whether or not a vehicle is parked in a parking stall based on captured image data.

According to an embodiment of the present technology, there is provided an image processing device including an image input unit configured to input captured image data of a portion of parking stalls that are compartmented at least by a first side line extending in a first direction and a second side line extending in the first direction, an image processing unit configured to generate edge image data by performing an edge extraction process on the captured image data, and a parking determination unit configured to obtain an integrated value of edge pixels of the first direction portion corresponding to the parking stalls in each position of a second direction that is orthogonal to the first direction based on the edge image data, and then to determine whether or not vehicles are parked in the parking stalls based on the obtained integrated value of each position of the second direction.

According to the embodiment of the present technology, the image input unit inputs the captured image data of the parking stall portion compartmented at least by the first side line and the second side line extending in the first direction. The image processing unit generates the edge image data by performing the edge extraction process on the captured image data. Then, the parking determination unit determines whether or not a vehicle is parked in the parking stall based on the edge image data. In this case, the integrated value of the edge pixels of the first direction portion corresponding to the parking stall of each position of the second direction that is orthogonal to the first direction is obtained based on the edge image data, and whether or not a vehicle is parked in the parking stall is determined based on the integrated value.

The image processing device may further include a projective transformation processing unit configured to perform a projective transformation process on the edge image data to transform an image captured with a perspective into an image viewed from straight above. The parking determination unit may obtain the integrated value of each position of the second direction based on the edge image data that has undergone the projective transformation process. By performing the projective transformation on the edge image data in this manner, the process of obtaining the integrated value of each position of the second direction becomes easy.

Further, each of the parking stalls may be compartmented by the first side line and the second side line and by a base line that is set to be on the opposite side of the entrance side and extends in the second direction. The first direction portion corresponding to each of the parking stalls may be set to be in a range from the entrance of the parking stall to the front of the base line. By setting the range of the first direction portion corresponding to the parking stall in this manner, the influence of edge pixels generated in the base line portion can be suppressed.

In the present technology as described above, it is determined whether or not a vehicle is parked in a parking stall based on the edge image data generated by performing the edge extraction process on the captured image data. For this reason, the determination of whether or not a vehicle is parked in a parking stall can be satisfactorily made.

Further, the image processing unit may have an edge extraction unit configured to generate edge intensity image data by performing an edge extraction process on the captured image data, a quantization unit configured to generate edge image data by performing a quantization process on the edge intensity image data, an edge labeling unit configured to regard edge pixel regions having connectivity with the edge image data as a same region, to perform a process of giving a same label number to edge pixels of the same region, and to generate labeled image data, a first rectangle objectification unit configured to perform a process of giving a circumscribed rectangle to the edge pixel regions to which the same label number is given based on the labeled image data, and to generate a rectangular object, and a first fine object removal unit configured to perform a process on the edge image data to remove an edge pixel region having a small number of connected pixels and an edge pixel region in a rectangular object having short vertical and horizontal widths as noise based on the labeled image data and the rectangular object, and to generate output edge image data. With the configuration described above, noise of the edge image data can be reduced, and the accuracy of the determination of whether or not a vehicle is parked in a parking stall can be enhanced.

Further, the first fine object removal unit may further perform a process on the labeled image data to remove the edge pixel region having a small number of connected pixels and the edge pixel region in the rectangular object having short vertical and horizontal widths as noise based on the labeled image data and the rectangular object, and to generate output labeled image data. A projective transformation unit configured to perform a projective transformation process on the edge image data and the labeled image data that are output from the first fine object removal unit to transform an image captured with a perspective into an image viewed from straight above may further be included. The parking determination unit may have a second rectangle objectification unit configured to generate a rectangular object by giving a circumscribed rectangle to the edge pixel regions to which the same label number is given based on the labeled image data output from the projective transformation unit, and a second fine object removal unit configured to perform a process on the edge image data output from the projective transformation unit to remove an edge pixel region that does not include an edge intensity equal to or greater than a predetermined value and an edge pixel region in a rectangular object having a width in the second direction smaller than a predetermined value as noise based on the labeled image data and the rectangular object, and to generate output edge image data. The integrated value of each position of the second direction may be obtained based on the edge image data output from the second fine object removal unit.

Further, the image processing device for a parking lane that is constituted by consecutively providing a plurality of parking stalls in the second direction, the device may further include a parking lane congestion degree computation unit configured to compute the degree of congestion of vehicles in the parking lane based on a determination result made by the parking determination unit with regard to the plurality of parking stalls. Since the determination of whether or not vehicles are parked in parking stalls can be satisfactorily made, the computation of the degree of congestion of vehicles in parking lanes can also be satisfactorily performed.

In such case, for example, the parking lane has a dual lane structure of a front lane and a rear lane. With regard to each of the parking stalls of the front lane, the parking determination unit may obtain the integrated value of edge pixels of the first direction portion corresponding to the parking stalls in each position of the second direction that is orthogonal to the first direction based on the edge image data, and then determine whether or not vehicles are parked in the parking stalls based on the obtained integrated value of each position. With regard to each of the parking stalls of the rear lane, the parking determination unit may obtain, as a first integrated value, the integrated value of the edge pixels of the first direction portion corresponding to the parking stalls in each position of the second direction that is orthogonal to the first direction based on the edge image data, obtain, as a second integrated value, the integrated value of edge pixels of a third direction portion that is orthogonal to both of the first direction and the second direction corresponding to the entrances of the parking stalls in each position of the second direction based on the edge image data, and thereby determine whether or not vehicles are parked in the parking stalls based on the obtained first and second integrated values of each position. With regard to each parking stall of the rear lane that is affected by vehicles parked in the front lane, whether or not vehicles are parked in the parking stalls is determined also considering the second integrated value that is the integrated value of the edge pixels of the third direction portion, and thus the accuracy of the determination can be enhanced.

In such case, for example, the image processing device may further include a projective transformation unit configured to perform a projective transformation process on the edge image data to transform an image captured with a perspective into an image viewed from straight above. The parking determination unit may obtain the integrated value based on the edge image data that has undergone the projective transformation process except for the second integrated value. By performing the projective transformation on the edge image data as described above, the process of obtaining the integrated value of each position of the second direction becomes easy.

According to an embodiment of the present technology, whether or not a vehicle is parked in a parking stall can be satisfactorily determined based on captured image data.

BRIEF DESCRIPTION OF THE DRAWINGS

FIGS. 7(a), 7(b), 7(c), and 7(d) are diagrams illustrating a captured image and an edge intensity image, an edge image, and a labeled image of the captured image;

DETAILED DESCRIPTION OF THE EMBODIMENT

Figure 1:
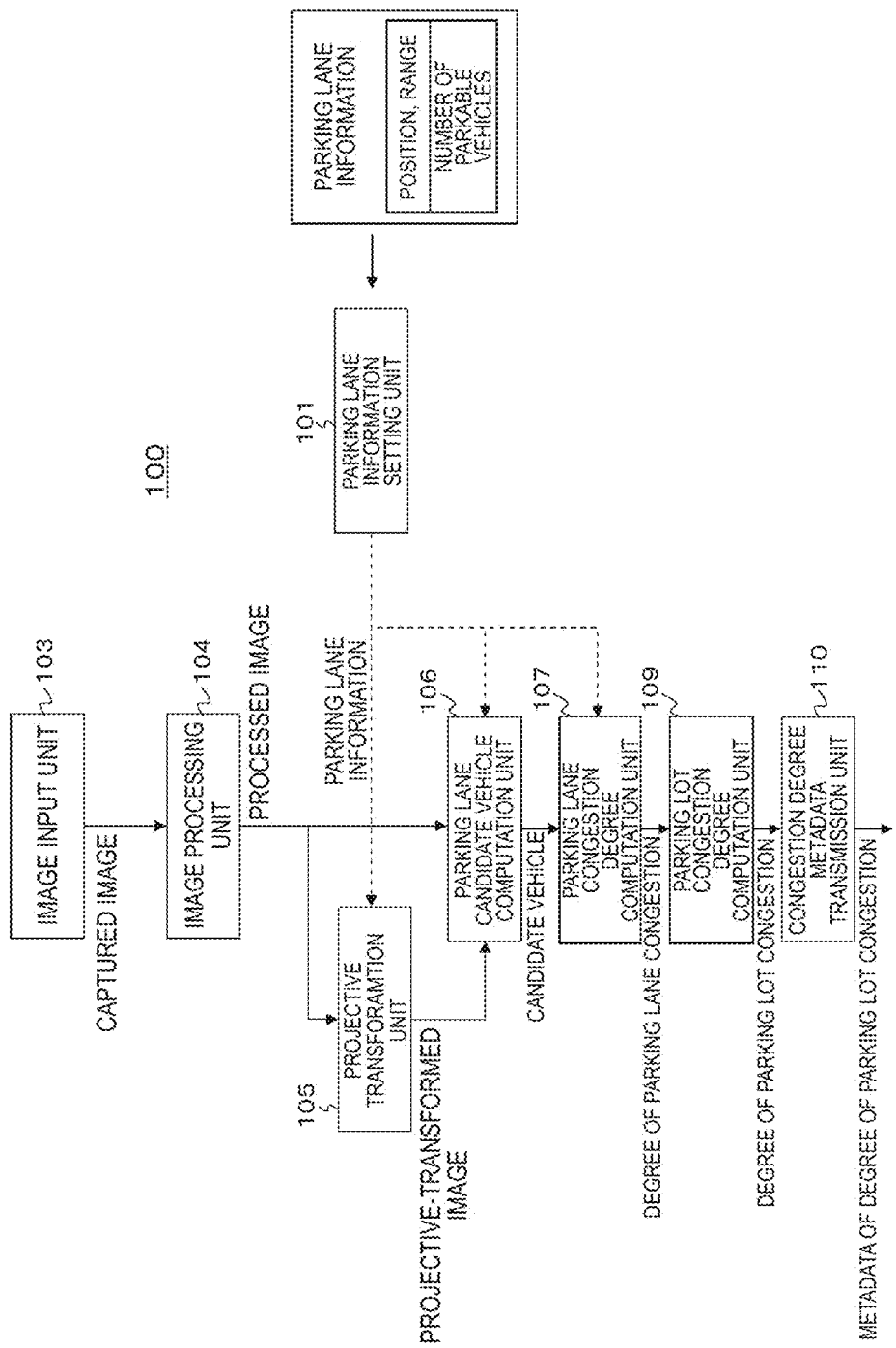
FIG. 1 is a block diagram illustrating a configuration example of an image processing device as an embodiment of the present technology.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, an embodiment for implementing the present technology (hereinafter referred to as an "embodiment") will be described. Note that description will be provided in the following order.

1. Embodiment
2. Modified example

1. Embodiment

Configuration Example of an Image Processing Device

FIG. 1 is a block diagram illustrating a configuration example of an image processing device 100 as an embodiment of the present technology. The image processing device 100 has a parking lane information setting unit 101, an image input unit 103, an image processing unit 104, and a projective transformation unit 105. In addition, the image processing device 100 has a parking lane candidate vehicle computation unit 106, a parking lane congestion degree computation unit 107, a parking lot congestion degree computation unit 109, and a congestion degree metadata transmission unit 110.

The image input unit 103 inputs captured image data of a parking lot such as a service area of an expressway, or the like. The captured image data is captured and acquired by, for example, a camera that is grounded in a relatively high position of a building near the parking lot. Note that the image input unit 103 may be such a camera itself. A captured image in this case is an image captured with a perspective.

Figure 2:
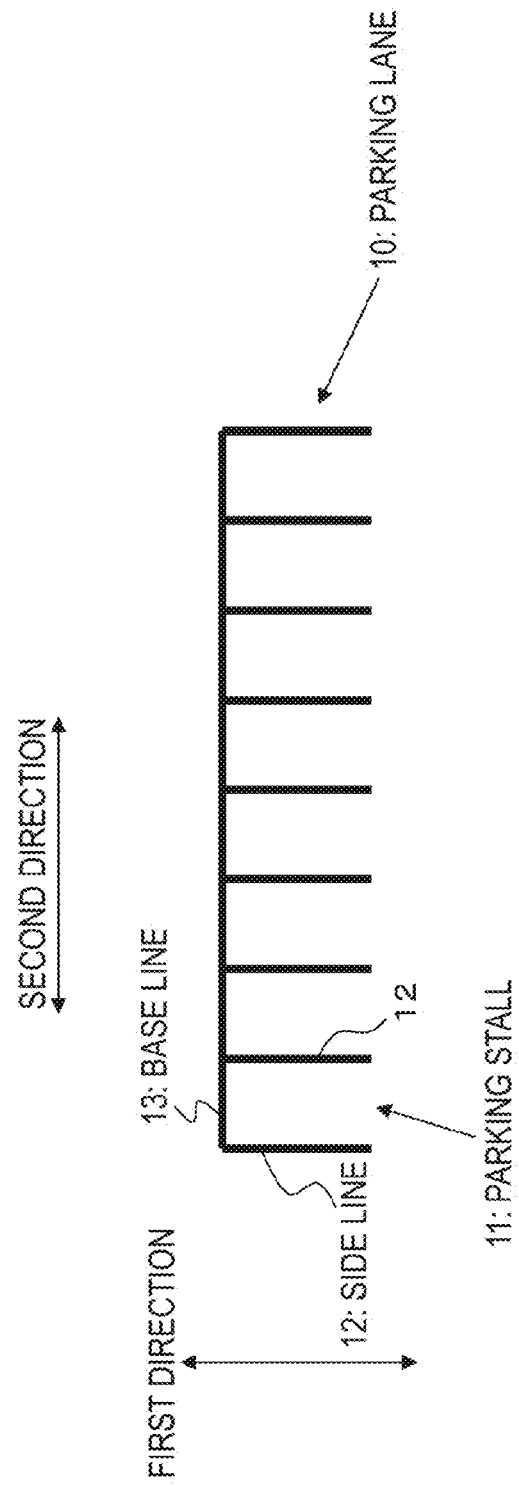
FIG. 2 is a diagram for describing a structure of a parking lane.

In a parking lot, there are a predetermined number of parking lanes. FIG. 2 illustrates a structure example of a parking lane 10. The parking lane 10 is consecutively provided with a plurality of parking stalls 11. Herein, a parking stall 11 is an area in which one vehicle can be parked. Each parking stall 11 is compartmented by two side lines 12 and 12 extending in a first direction and a base line 13 extending in a second direction that is present on the opposite side of the entrance and orthogonal to the first direction. The parking lane 10 is configured to be consecutively provided with the plurality of parking stalls 11 in the second direction. Note that the side line 12 does not have to be one line, and may be drawn with two lines in a U shape.

Note that there are cases in which each parking stall 11 is compartmented only by two side lines 12 and 12, or each parking stall 11 is compartmented by an entrance line (not illustrated in FIG. 2) present on the entrance side extending in the second direction together with the two side lines 12 and 12 and the base line 13.

Figure 3:
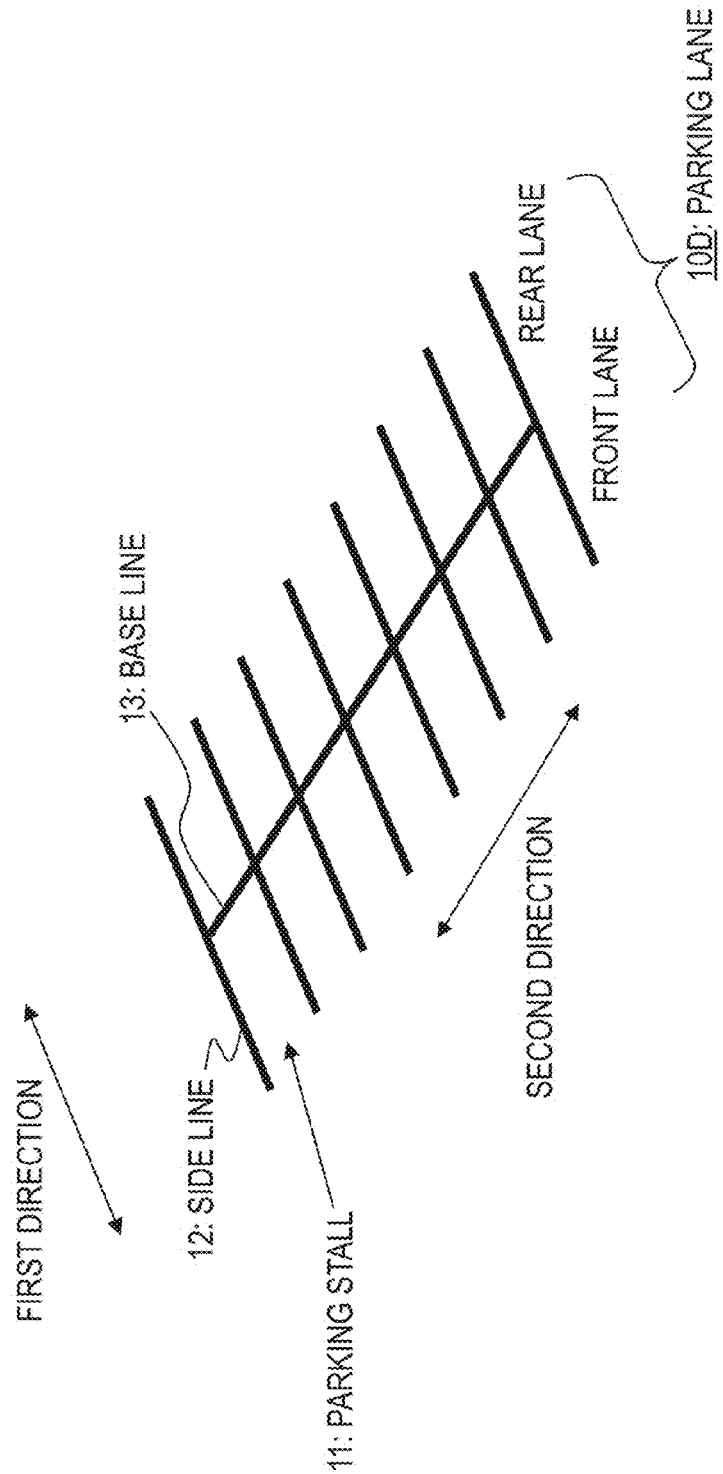
FIG. 3 is a diagram for describing a parking lane of a dual lane structure including a front lane and a rear lane.

In many cases, a plurality of parking lanes 10D are disposed in a parking lot such as a service area as illustrated in FIG. 3. Such a parking lane 10D has a dual lane structure of a front lane and a rear lane. Although detailed description will be omitted, the structure of each lane is the same as that of the parking lane 10 described above (see FIG. 2). Note that a front lane is a lane close to a camera, and a rear lane is a lane far from the camera. In the present embodiment, the plurality of parking lanes 10D are set to be disposed in a parking lot.

Returning to FIG. 1, the parking lane information setting unit 101 sets parking lane information such as a position and a range, and the number of vehicles parkable in the parking lanes 10D according to, for example, a setting operation of the parking lane information by a user. Then, the parking lane information setting unit 101 supplies the set parking lane information to the projective transformation unit 105, the parking lane candidate vehicle computation unit 106, and the parking lane congestion degree computation unit 107.

Figure 4:
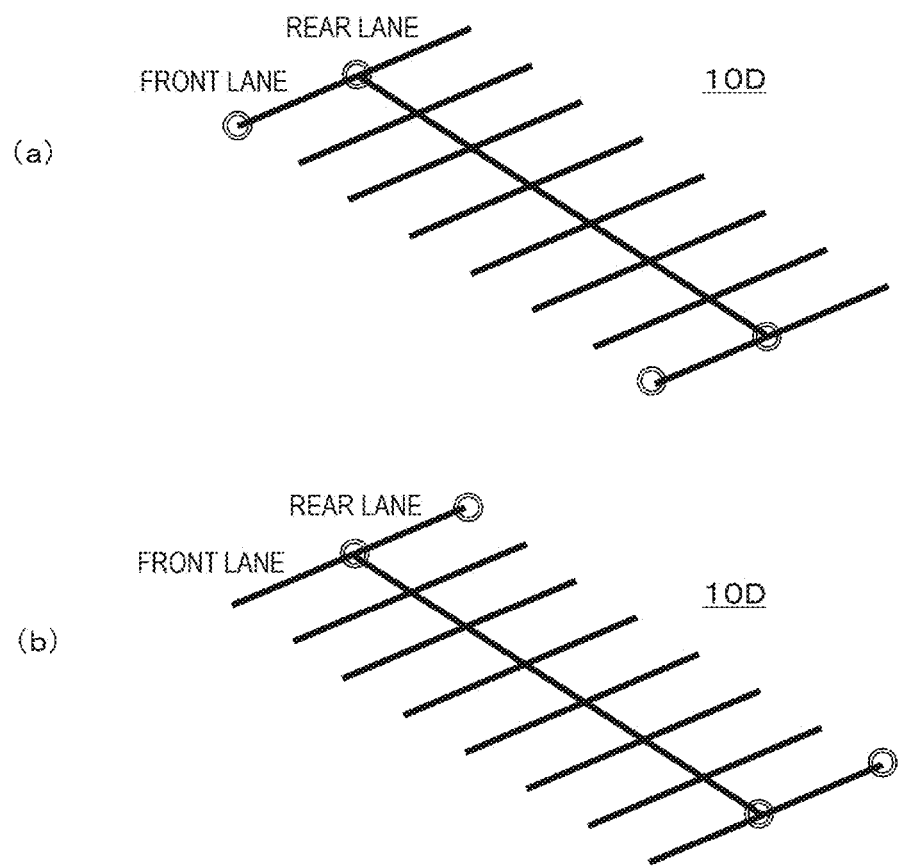
FIGS. 4(a) and 4(b) are diagrams for describing setting of parking lane information (positional information of four corners of each of a front lane and a rear lane) in a parking lane information setting unit.

The parking lane information setting unit 101 sets, for example, individual positions and ranges of the front lane and the rear lane of each parking lane 10D. For example, a user performs a setting operation of a position and a range of the front lane by clicking a mouse while positioning a cursor on the four corners (see the dual circles of FIG. 4(a)) of the front lane on a captured image of a parking lot displayed on a monitor (not illustrated in FIG. 1) and then inputting the position coordinates of the four corners of the front lane. In the same manner, the user performs a setting operation of a position and a range of the rear lane by clicking the mouse while positioning the cursor on the four corners (see the dual circles of FIG. 4(b)) of the rear lane on the captured image of the parking lot displayed on the monitor and then inputting the position coordinates of the four corners of the rear lane.

Note that inputting not only the position coordinates of the four corners of the front lane and the rear lane but also the position coordinates of the four corners of all of the parking stalls 11 as the parking lane information is considered. In this case, a calculation process for determining whether or not vehicles are parked in each of the parking stalls 11 can be simply and accurately performed. However, in terms of the entire parking lot, there are a large number of parking stalls 11 and the user's work of inputting position coordinates is cumbersome. For this reason, in the present embodiment, an input operation of the position coordinates of the four corners is performed for each lane of the front lane and the rear lane, not for each parking stall 11, and accordingly, the position and the range thereof are set.

Figure 5:
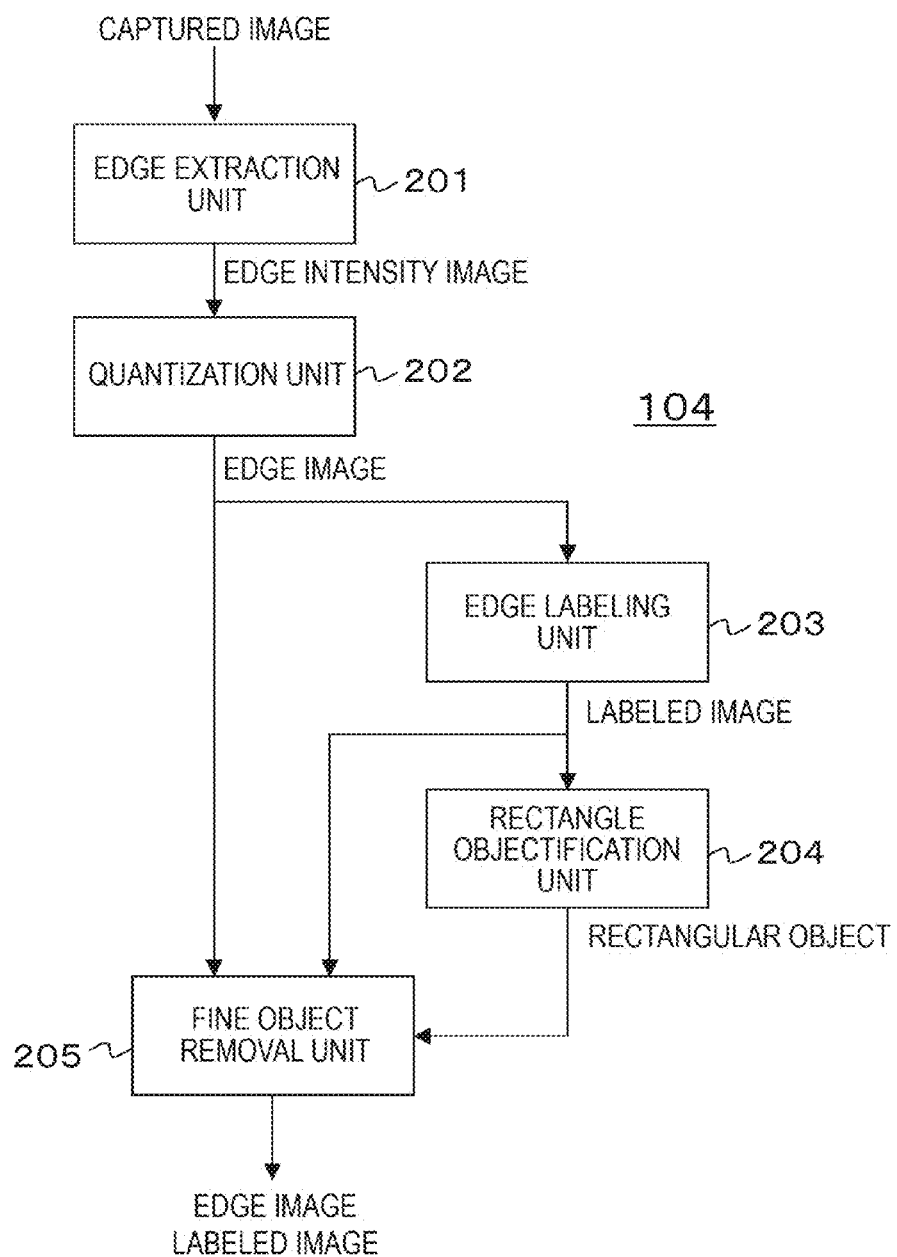
FIG. 5 is a block diagram illustrating a detailed configuration example of an image processing unit.

The image processing unit 104 performs an edge extraction process on the captured image data input to the image input unit 103, and then outputs edge image data and labeling image data. FIG. 5 illustrates a configuration example of the image processing unit 104. The image processing unit 104 has an edge extraction unit 201, a quantization unit 202, an edge labeling unit 203, a rectangle objectification unit 204, and a fine object removal unit 205.

The edge extraction unit 201 performs an edge extraction process on the captured image data and thereby generates edge intensity image data. The edge extraction unit 201 generates the edge intensity image data using, for example, a canny edge detector. Herein, the edge intensity image data is image data obtained by extracting edges in a captured image, and a value of pixel data indicates the intensity of an edge. The intensity of an edge ranges from a level of 0 to 255 when pixel data is expressed in 8 bits.

The quantization unit 202 performs a quantization process on the edge intensity image data generated by the edge extraction unit 201, and thereby generates edge image data. In the present embodiment, each piece of pixel data of the edge intensity image data is quantized to be, for example, ternary, and $dI'(x) \in \{0, 1, 2\}$ is obtained as the edge image data. Note that the quantization is not limited to being ternary.

The edge labeling unit 203 regards edge pixel regions having connectivity on the edge image data generated by the quantization unit 202 as the same region, and performs a process of giving the same label number to edge pixels in the same region and thereby generates labeled image data. In other words, the edge labeling unit 203 generates the labeled image data from the connectivity of pixels with the condition of dI'(x)>0 of the edge image data.

Figure 6:
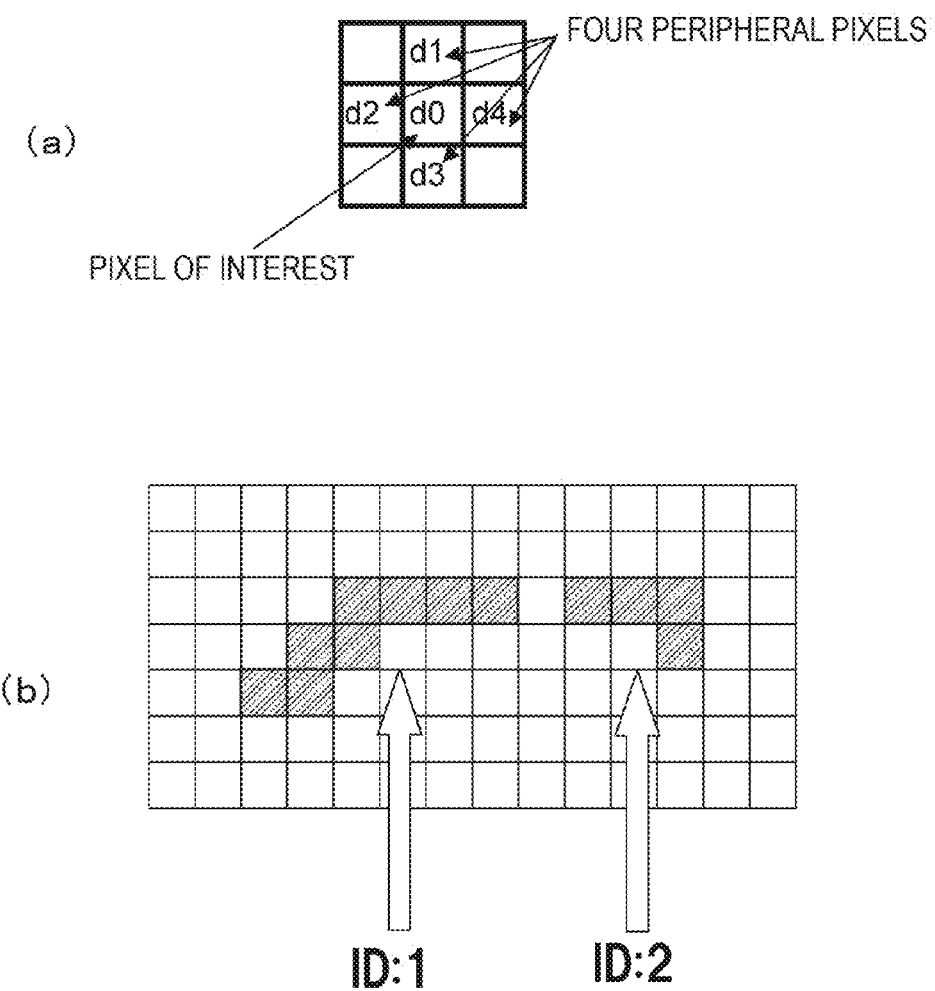
FIGS. 6(a) and 6(b) are diagrams for describing a process performed by an edge labeling unit.

Here, as illustrated in FIG. 6(a), pixels in, for example, four peripheral spots having connectivity are set to be regarded as the same region. In this case, a pixel having an edge intensity of "1" or "2" is set to be a pixel of interest d0, and the edge intensities of pixels d1, d2, d3, and d4 in the four peripheral spots are checked. Pixels having the edge intensity of "1" or "2" are set to be pixels having connectivity. Hereinafter, by repeating the same process by setting pixels with connectivity to be new pixels of interest, edge pixel regions to which the same label number is given are formed.

FIG. 6(b) illustrates an example of the labeling image data. "1" is given to the edge pixel region on the left side as a label number (ID), and "2" is given to the edge pixel region on the right side as a label number (ID). Note that, instead of regarding pixels in four peripheral spots having connectivity as the same region, regarding pixels in eight peripheral spots having connectivity as the same region is also considered. The eight peripheral pixels include four more pixels positioned in an oblique direction with respect to the pixel of interest d0 in addition to the pixels d1, d2, d3, and d4 in the four peripheral spots described above (see FIG. 6(b)).

FIGS. 7(a), 7(b), 7(c), and 7(d) illustrate a captured image and an edge intensity image, an edge image, and a labeled image of the captured image. FIG. 7(a) illustrates an example of a captured image, and FIGS. 7(b), 7(c), and 7(d) each illustrate the edge intensity image, the edge image, and the labeled image corresponding to the captured image illustrated in FIG. 7(a). Note that the labeled image has the same form as the edge image, but the same label number (ID) is given to connected pixels as described above.

Returning to FIG. 5, the rectangle objectification unit 204 performs a process of giving circumscribed rectangles to the edge pixel regions to which the same label number is given based on the labeled image data generated by the edge labeling unit 203, and thereby generates rectangular objects. Here, a circumscribed rectangle refers to a rectangle having (the minimum X coordinate, the minimum Y coordinate)–(the maximum X coordinate, the maximum Y coordinate) of the edge pixel regions to which the same label number is given also in the opposing angles.

Figure 8:
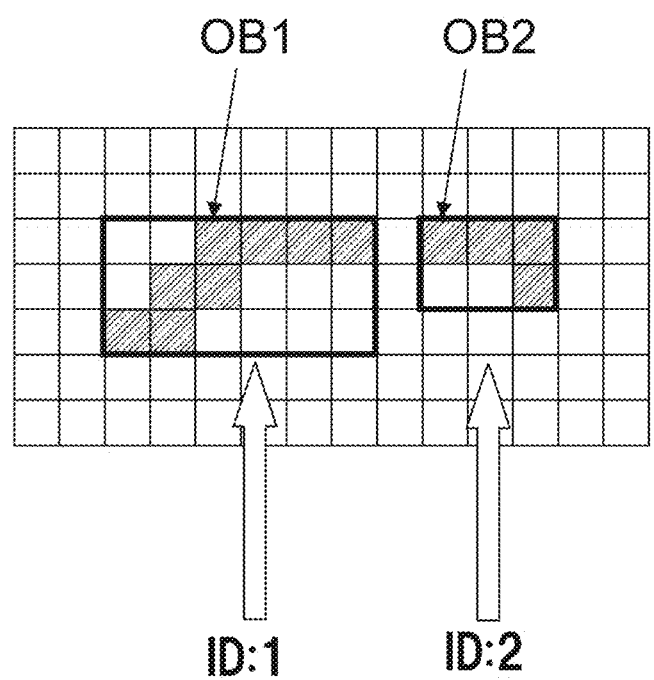
FIG. 8 is a diagram illustrating an example of rectangular objects generated by a rectangle objectification unit.

FIG. 8 illustrates an example of rectangular objects. This example is obtained by performing the process of giving the circumscribed rectangles to the labeled image data illustrated in FIG. 6(b) described above. A rectangular object OB1 is obtained by performing the process of giving a circumscribed rectangle to the edge pixel region having a label number (ID) of "1." In addition, a rectangular object OB2 is obtained by performing the process of giving a circumscribed rectangle to the edge pixel region having a label number (ID) of "2."

The fine object removal unit 205 performs a noise removal process on the edge image data generated by the quantization unit 202 and the labeled image data generated by the edge labeling unit 203, and thereby generates output edge image data and output labeled image data. The fine object removal unit 205 performs the noise removal process based on the labeled image data and the rectangular objects generated by the rectangle objectification unit 204.

In this case, the fine object removal unit 205 removes an edge pixel region in which the number of pixels to be connected is small, and thus the number of pixels to be connected is smaller than a predetermined threshold value as noise. In addition, in this case, the fine object removal unit 205 removes an edge pixel region in a rectangular object of which the vertical width and the horizontal width are small and thus each of the vertical width and the horizontal width is smaller than a predetermined threshold value as noise.

An operation of the image processing unit 104 illustrated in FIG. 5 will be briefly described. The captured image data input to the image input unit 103 is supplied to the edge extraction unit 201. The edge extraction unit 201 performs an edge extraction process on the captured image data, and thereby generates edge intensity image data. The edge intensity image data is supplied to the quantization unit 202. The quantization unit 202 performs a quantization process on the edge intensity image data, and thereby generates edge image data. The edge image data is supplied to the edge labeling unit 203 and the fine object removal unit 205.

The edge labeling unit 203 regards edge pixel regions having connectivity in the edge image data as the same region, performs a process of giving the same label number to edge pixels of the same region, and thereby generates labeled image data (see FIG. 6(b)). The labeled image data is supplied to the rectangle objectification unit 204 and the fine object removal unit 205.

The rectangle objectification unit 204 performs a process of giving circumscribed rectangles to the edge pixel regions to which the same label number is given based on the labeled image data, and thereby generates rectangular objects (see FIG. 8). The rectangular objects are supplied to the fine object removal unit 205.

The fine object removal unit 205 removes noise of the edge image data generated by the quantization unit 202 and the labeled image data generated by the edge labeling unit 203, and thereby generates output edge image data and output labeled image data. In this case, an edge pixel region in which the number of connected pixels is small is removed as noise, and an edge pixel region in a rectangular object having small vertical width and horizontal width is removed as noise.

Returning to FIG. 1, the projective transformation unit 105 performs a projective transformation process of transforming an image captured with a perspective into an image viewed from straight above on the processed image data (edge image data and labeled image data) output from the image processing unit 104 based on parking lane information. Then, the projective transformation unit 105 outputs projective transformed image data (edge image data and labeled image data).

Figure 9:
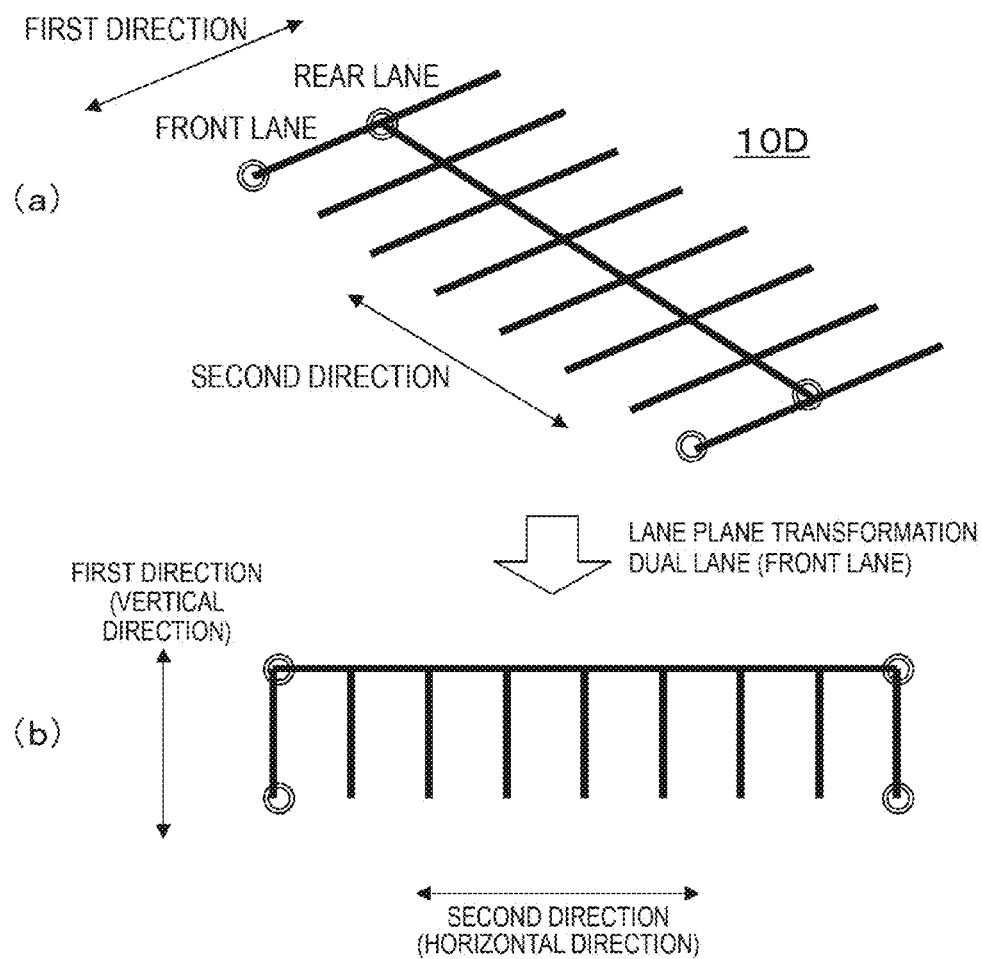
FIGS. 9(a) and 9(b) are diagrams illustrating a projective transformation example of a front lane by a projective transformation unit.
Figure 10:
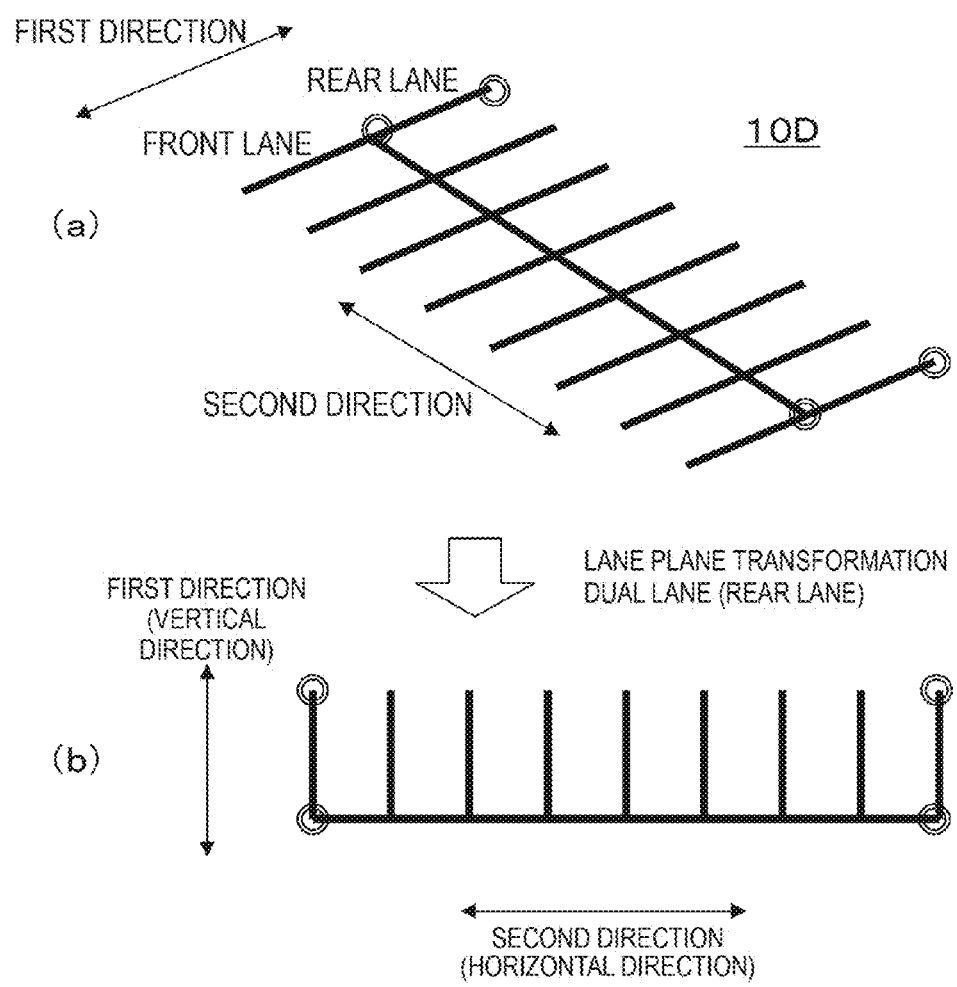
FIGS. 10(a) and 10(b) are diagrams illustrating a projective transformation example of a rear lane by the projective transformation unit.

FIGS. 9(a), 9(b), 10(a), and 10(b) illustrate a projective transformation example. In this example, only the parking lane 10D is set to undergo projective transformation when no vehicle is parked in the parking lane 10D. FIGS. 9(a) and 10(a) illustrate the parking lane 10D before projective transformation. In addition, FIG. 9(b) illustrates a front lane after projective transformation. In addition, FIG. 10(b) illustrates a rear lane after projective transformation. In this case, the four corners (indicated by dual circles) of the front lane and the rear lane of the parking lane 10D before projective transformation are formed to be rectangular shapes after projective transformation. In addition, after projective transformation, a first direction coincides with the vertical direction, and a second direction coincides with the horizontal direction.

The projective transformation unit 105 performs a projective transformation (homography) process based on, for example, the following numerical expression (1). Here, "A" is a camera parameter, "r1 and r2" are rotation vectors, and "t" is a parallel movement vector. The projective transformation unit 105 transforms the coordinates (X, Y) into the coordinates (u, v) based on the numerical expression (1).

$$\begin{bmatrix} u \\ v \\ 1 \end{bmatrix} = A[r_1 \; r_2 \; t] \begin{bmatrix} X \\ Y \\ 1 \end{bmatrix} = H \begin{bmatrix} X \\ Y \\ 1 \end{bmatrix} \quad (1)$$

The position coordinates of four corners of a parking lane before projective transformation are set to be P0, P1, P2, and P3, and those of four corners of the parking lane after conversion projection are set to be p0, p1, p2, and p3. If there are at least four pairs of coordinates in the projective transformation, a homography matrix H is obtained through a least-square method. If H is obtained beforehand, projective transformation of an image is possible. The pairs of the four points are given to the parking lane information setting unit 101.

Figure 11:
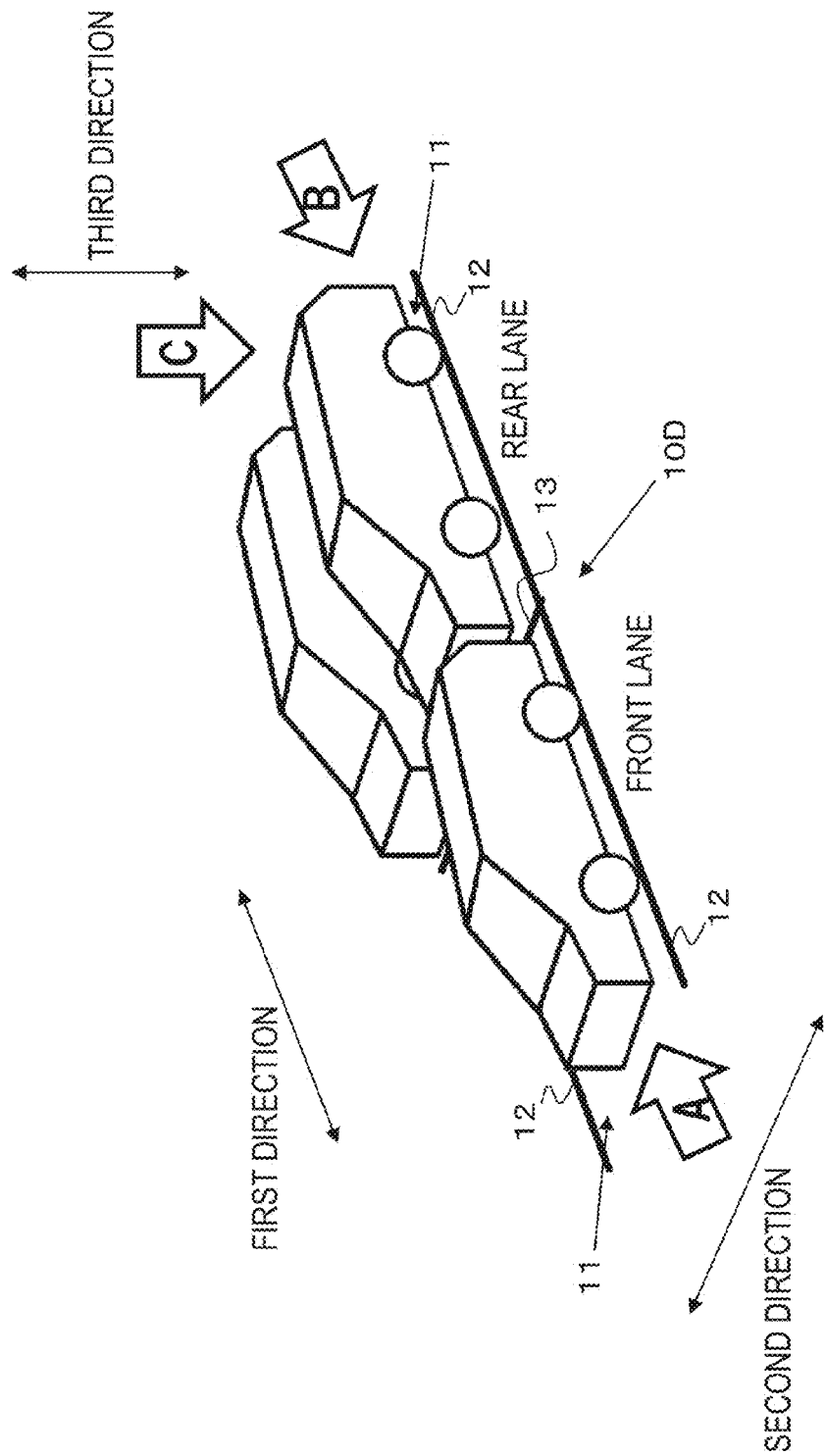
FIG. 11 is a diagram illustrating an example of a (partial) image when vehicles are parked in dual structure parking lanes.

The parking lane candidate vehicle computation unit 106 detects a candidate vehicle parked in the parking lane 10D. FIG. 11 illustrates an example of a (partial) image when a vehicle is parked in the parking lane 10D. As illustrated, when a vehicle is parked in the front lane, the vehicle covers a part of a vehicle parked in the rear lane.

In order to avoid the problem of covering, the parking lane vehicle candidate computation unit 106 determines the presence of a vehicle in the parking stall 11 in three directions of the A, B and C directions as illustrated. The parking lane vehicle candidate computation unit 106 confirms the presence of the vehicle parked in the front lane in the A direction which is parallel with the side line (white line) 12 compartmenting the parking stall 11. The A direction is one direction of the first direction.

In addition, the parking lane candidate vehicle computation unit 106 confirms the presence of the vehicle parked in the rear lane in the B direction which is parallel with the other side line (white line) 12 compartmenting the parking stall 11 and in the C direction which is the vertical direction to the image. The B direction is the other direction of the first direction and opposite to the A direction. In addition, the C direction is a direction orthogonal to both of the first and the second directions.

Since the front side (front bumper) of the vehicle in the front lane is not normally covered, it is not necessary to check the vehicle in two directions as in the rear lane. For the rear lane, it is necessary to use the C direction in addition to the B direction in order to respond to a case in which vehicles are parked in the front lane and an adjacent parking stall 11. Note that it is assumed that a camera is installed in the horizontal direction in order to check the presence of vehicles in the vertical direction. When the camera is not installed in the horizontal direction, the C direction may be adjusted in accordance with the rotation of the camera.

The parking lane candidate vehicle computation unit 106 obtains a candidate vehicle of the front lane in the A direction. At this moment, the parking lane candidate vehicle computation unit 106 uses edge image data that has undergone projective transformation. In this case, a noise removal process is performed beforehand on the edge image data that has undergone the projective transformation in the same manner as the fine object removal unit 205 (see FIG. 5) of the image processing unit 104 described above.

Figure 12:
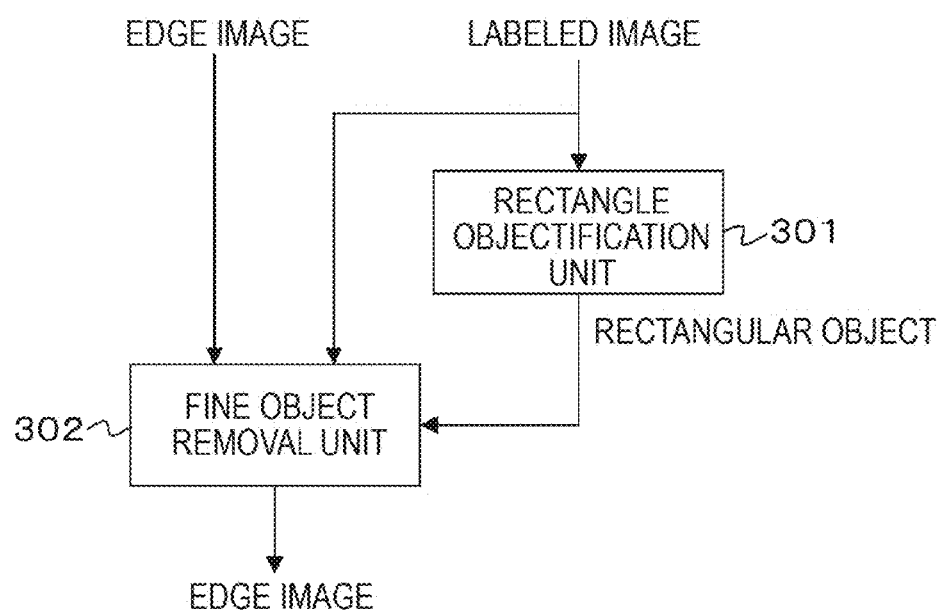
FIG. 12 is a block diagram illustrating a configuration example of a noise removal processing unit of a parking lane candidate vehicle computation unit.

FIG. 12 illustrates a configuration example of a noise removal processing unit of the parking lane candidate vehicle computation unit 106. The noise removal processing unit has a rectangle objectification unit 301, and a fine object removal unit 302. The rectangle objectification unit 301 performs a process of giving circumscribed rectangles to edge pixel regions to which the same label number is given based on labeled image data that has undergone projective transformation and thereby generates rectangular objects in the same manner as the rectangle objectification unit 204 (see FIG. 5) of the image processing unit 104 described above.

The fine object removal unit 302 performs a noise removal process on the edge image data that has undergone projective transformation, and thereby generates output edge image data. The fine object removal unit 302 performs the noise removal process based on the labeled image data that has undergone projective transformation and the rectangular objects generated by the rectangle objectification unit 301.

In this case, the fine object removal unit 302 removes an edge pixel region in the rectangular objects having a narrow horizontal width as noise. Accordingly, most of the edge pixels corresponding to the side lines 12 compartmenting the parking stalls 11 are removed.

In addition, the fine object removal unit 302 also removes an edge pixel region in the rectangular objects that do not include pixels having strong edge intensity as noise. As described above, the edge image data is expressed by $dI'(x) \in \{0, 1, 2\}$. An edge pixel region constituted by edge pixels only having an edge intensity of "1" is removed as a weak edge generated from a shadow, or the like.

Figure 13:
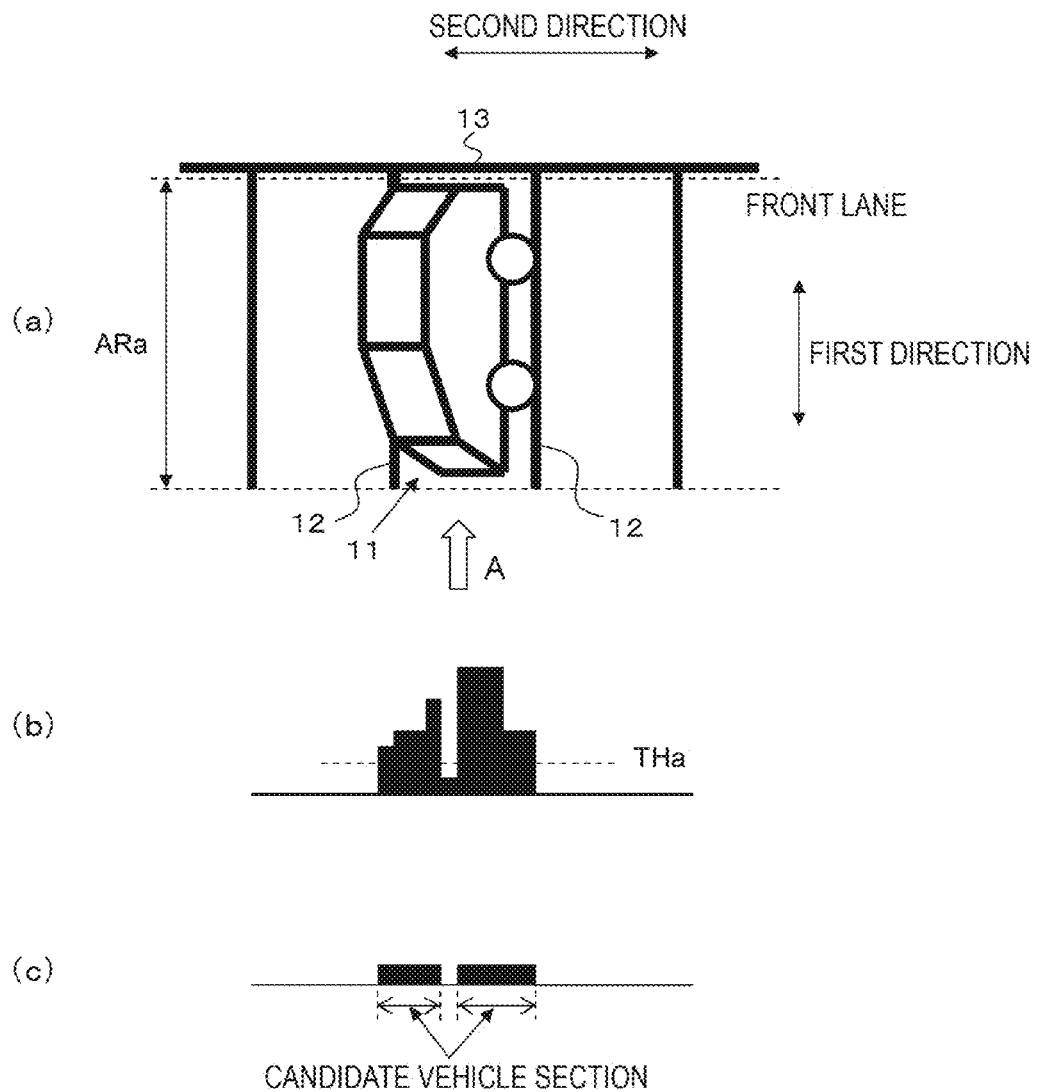
FIGS. 13(a), 13(b), and 13(c) are diagrams for describing obtaining a candidate vehicle section of a front lane by integrating edge pixels in an A direction.

FIG. 13(a) illustrates an example of the edge image data (after noise removal) that has undergone projective transformation. At this point, edge pixels corresponding to the side lines 12 compartmenting the parking stalls 11 have actually already been removed by the fine object removal unit 302.

The parking lane candidate vehicle computation unit 106 obtains an integrated value of the edge pixels in a portion of the first direction (A direction) corresponding to the parking stalls 11 in each position of the second direction. For example, the portion of the first direction is set as a range ARa from the entrance of each parking stall 11 to the right front of the base line 13. By setting the range of the integration as described above, the influence of the edge pixels generated in a portion of the base line 13 can be suppressed. FIG. 13(b) illustrates an example of an integrated value in each position of the second direction.

The parking lane candidate vehicle computation unit 106 compares the integrated value in each position of the second direction obtained as described above to a threshold value THa, and sets a section in which the integrated value is greater than THa to be a candidate vehicle section. At this moment, when a candidate vehicle section is adjacent to another candidate vehicle section to some degree, the parking lane candidate vehicle computation unit 106 puts both of the candidate vehicle sections together and sets them to be one candidate vehicle section. FIG. 13(c) illustrates an example of the candidate vehicle section. The parking lane candidate vehicle computation unit 106 sets all sets of candidate vehicle sections to be candidate vehicles of the front lanes.

In addition, the parking lane candidate vehicle computation unit 106 obtains candidate vehicles of the rear lanes in the B and the C directions. First, the parking lane candidate vehicle computation unit 106 obtains candidate vehicle sections of the rear lanes in the B direction. At this moment, the parking lane candidate vehicle computation unit 106 uses the edge image data (after noise removal) that has undergone projective transformation. FIG. 14(c) illustrates an example of the edge image data (after noise removal) that has undergone projective transformation. At this point, edge pixels corresponding to the side lines 12 compartmenting the parking stalls 11 have actually already been removed by the fine object removal unit 302.

Figure 14:
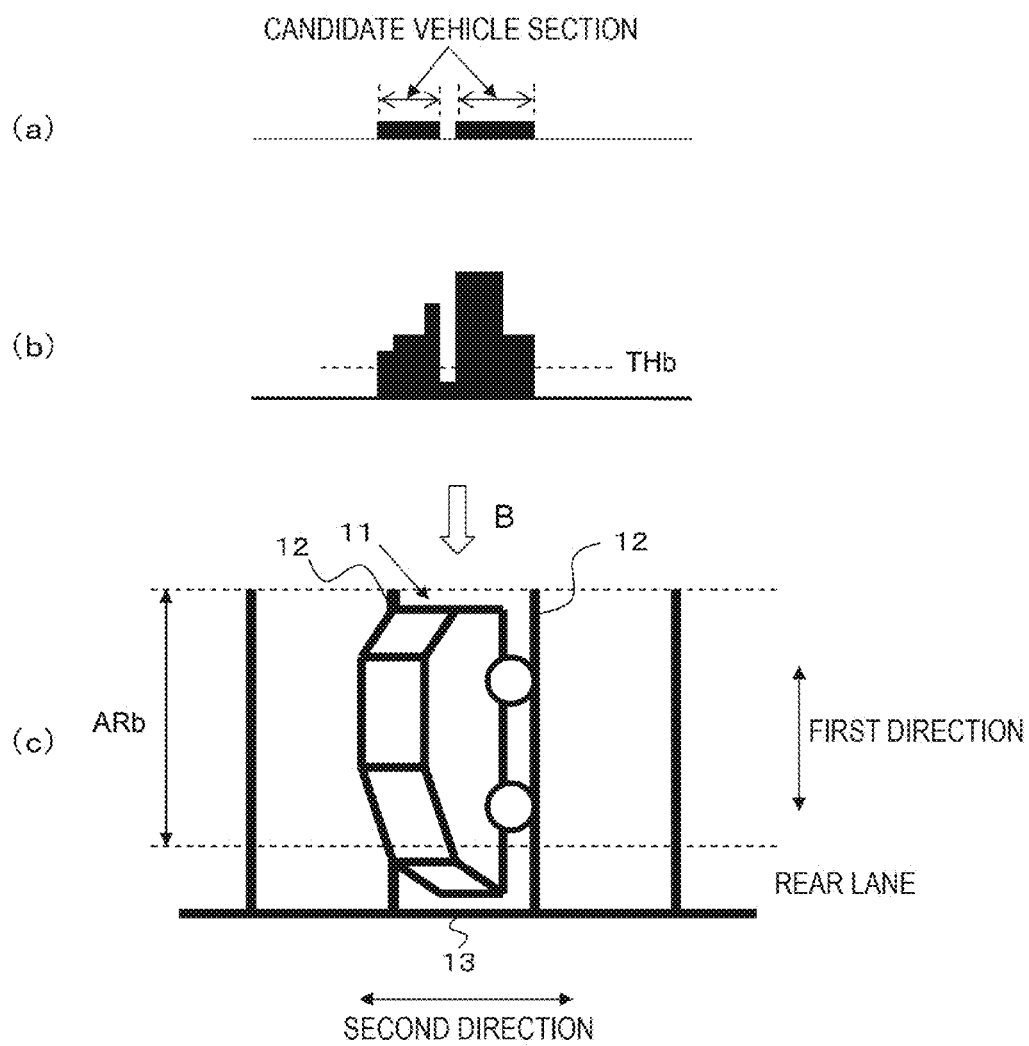
FIGS. 14(a), 14(b), and 14(c) are diagrams for describing obtaining a candidate vehicle section of a rear lane by integrating edge pixels in a B direction.

The parking lane candidate vehicle computation unit 106 obtains an integrated value of the edge pixels in a portion of the first direction (B direction) corresponding to the parking stalls 11 in each position of the second direction. For example, the portion of the first direction is set as a range ARb from the entrance of each parking stall 11 to the right front of the base line 13. By setting the range of the integration as described above, the influence of the edge pixels generated due to the vehicles parked in the front lanes can be suppressed. FIG. 14(*b*) illustrates an example of an integrated value in each position of the second direction.

The parking lane candidate vehicle computation unit 106 compares the integrated value in each position of the second direction obtained as described above to a threshold value THb, and sets a section in which the integrated value is greater than THb to be a candidate vehicle section. At this moment, when a candidate vehicle section is adjacent to another candidate vehicle section to some degree, the parking lane candidate vehicle computation unit 106 puts both of the candidate vehicle sections together and sets them to be one candidate vehicle section. FIG. 14(*a*) illustrates an example of the candidate vehicle section.

Figure 15:
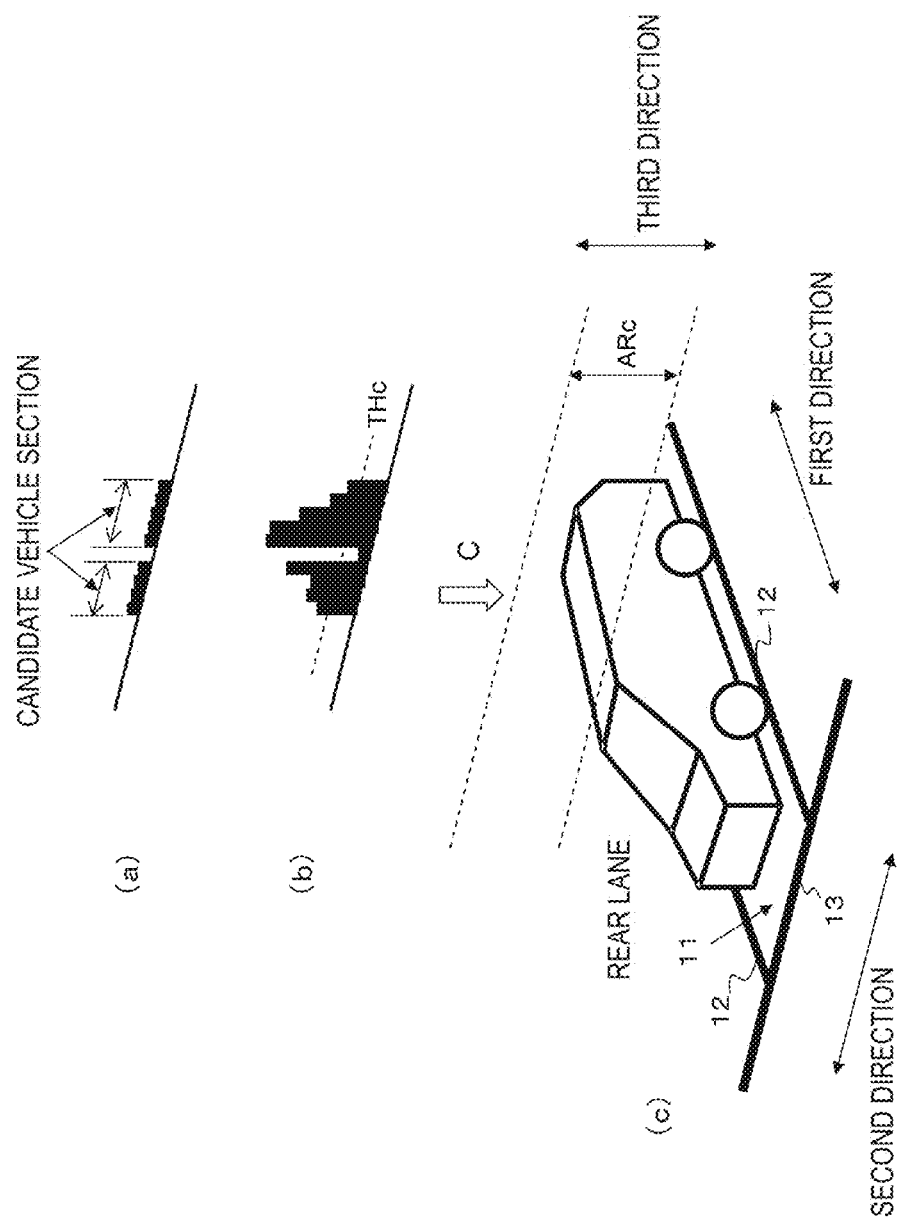
FIGS. 15(a), 15(b), and 15(c) are diagrams for describing obtaining a candidate vehicle section of the rear lane by integrating edge pixels in a C direction.

Next, the parking lane candidate vehicle computation unit 106 obtains candidate vehicle sections of the rear lanes in the C direction. At this moment, the parking lane candidate vehicle computation unit 106 uses the edge image data that has not undergone projective transformation. FIG. 15(*c*) illustrates an example of the edge image data that has not undergone projective transformation. The parking lane candidate vehicle computation unit 106 obtains an integrated value of edge pixels in a portion of the third direction (C direction) corresponding to the parking stalls 11 in each position of the second direction. For example, the portion of the third direction is set as a range ARc from the entrance of each parking stall 11 to a position a predetermined distance above (which can be set from the height of a general vehicle). FIG. 15(*b*) illustrates an example of the integrated value in each position of the second direction.

The parking lane candidate vehicle computation unit 106 compares the integrated value in each position of the second direction obtained as described above to a threshold value THc, and sets a section in which the integrated value is greater than THc to be a candidate vehicle section. At this moment, when a candidate vehicle section is adjacent to another candidate vehicle section to some degree, the parking lane candidate vehicle computation unit 106 puts both of the candidate vehicle sections together and sets them to be one candidate vehicle section. FIG. 15(*a*) illustrates an example of the candidate vehicle section.

Next, the parking lane candidate vehicle computation unit 106 puts the candidate vehicle section of each rear lane obtained in the B direction (first candidate vehicle section) and the candidate vehicle section of each rear lane obtained in the C direction (second candidate vehicle section) together and sets them to be one candidate vehicle section. Since the parking lane candidate vehicle computation unit 106 evaluates the second candidate vehicle section to be on the same plane of the first candidate vehicle section, the parking lane candidate vehicle computation unit converts projection of the second candidate vehicle section onto the plane of the first candidate vehicle section.

The parking lane candidate vehicle computation unit 106 takes the logical sum (AND) of the two candidate vehicle sections, and resets the result to be a candidate vehicle section. When the logical sum is taken as described above, the candidate vehicle section can be obtained without confusion from a shadow cast in the parking stalls 11. The shadow is not obtained as a candidate vehicle section of the C direction. After the parking lane candidate vehicle computation unit 106 takes the logical sum as described above, when a candidate vehicle section is adjacent to another candidate vehicle section to some degree, the parking lane candidate vehicle computation unit puts both of the candidate vehicle sections together again and sets them to be one candidate vehicle section. Then, the parking lane candidate vehicle computation unit 106 sets all sets of candidate vehicle sections to be candidate vehicles of the rear lanes.

Returning to FIG. 1, the parking lane congestion degree computation unit 107 computes the degree of congestion of each parking lane based on the candidate vehicles of the front lane and the rear lane obtained by the parking lane candidate vehicle computation unit 106, and the parking lane information set by the parking lane information setting unit 101. In this case, the number of vacant parking stalls 11 among parking stalls 11 in which vehicles can be parked based on the parking lane information becomes a problem. For this reason, when one vehicle is parked over two parking stalls 11, it is counted as two parked vehicles.

Figure 16:
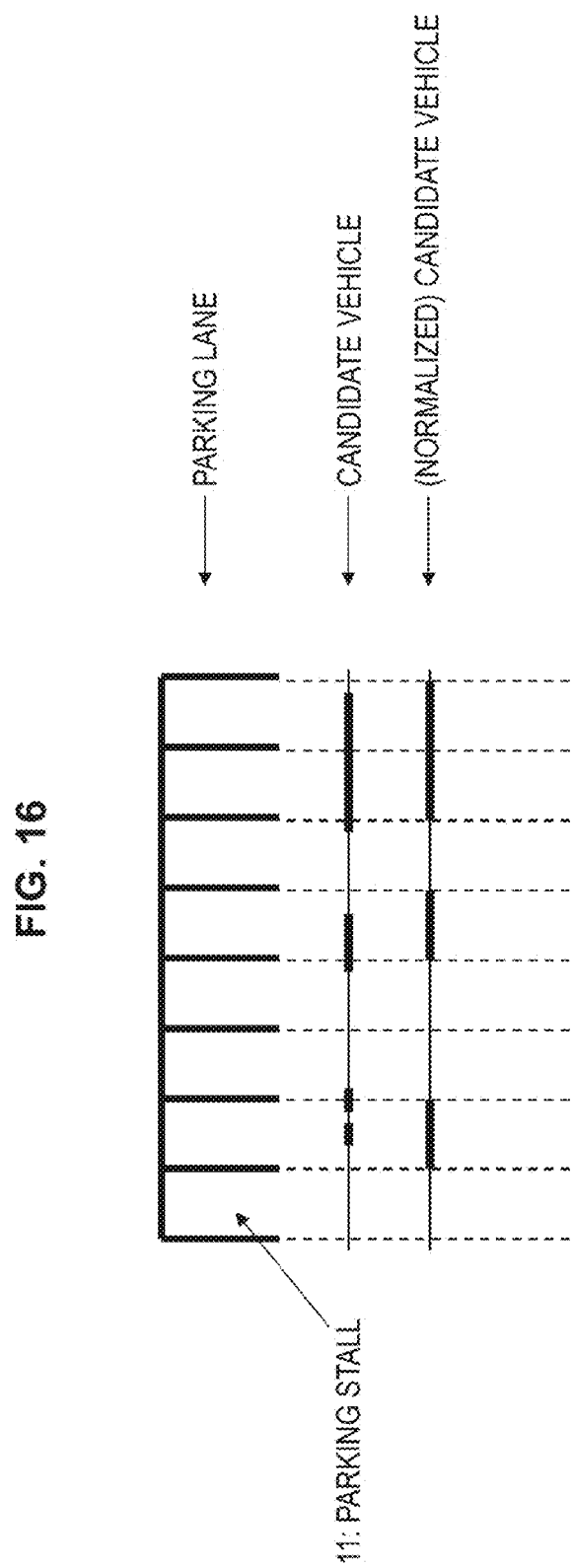
FIG. 16 is a diagram illustrating an example of the correspondence relationship between each parking stall of a parking lane (a front lane or a rear lane), candidate vehicles obtained by the parking lane candidate vehicle computation unit, and normalized candidate vehicles.

For this reason, the parking lane congestion degree computation unit 107 performs normalization on the candidate vehicles of the front lanes and the rear lanes for each lane in accordance with the parking stalls 11. FIG. 16 illustrates an example of the correspondence relationship between each parking stall 11 of a parking lane (a front lane or a rear lane), candidate vehicles obtained by the parking lane candidate vehicle computation unit 106, and normalized candidate vehicles. After performing normalization, the parking lane congestion degree computation unit 107 sets the number of parking stalls 11 filled with candidate vehicles to be the number of vehicles parked in the parking lane 10D, and divides the number of vehicles by the number of vehicles parkable in the parking lane 10D, and thereby obtains the degree of parking lane congestion.

The parking lot congestion degree computation unit 109 brings the degrees of congestion of parking lanes of all parking lanes 10D in a captured image which are computed by the parking lane congestion degree computation unit 107 together, and the computes the degree of parking lot congestion which is the degree of congestion of the entire parking lot. Note that imaging a parking lot using a plurality of cameras is also considered. In this case, the parking lot congestion degree computation unit 109 receives the degrees of congestion of parking lanes of each parking lane 10D included in an image captured by each camera from the parking lane congestion degree computation unit 107, and computes the degree of parking lot congestion of the entire parking lot.

The congestion degree metadata transmission unit 110 transmits the degree of parking lot congestion computed by the parking lot congestion degree computation unit 109 as metadata of the degree of parking lot congestion.

An operation of the image processing device 100 illustrated in FIG. 1 will be briefly described. In the parking lane information setting unit 101, parking lane information such as a position and a range of each parking lane 10D and the number of vehicles parkable in a parking lot is set according to a setting operation of the parking lane information by a user. Captured image data of the parking lot input to the image input unit 103 is supplied to the image processing unit 104.

The image processing unit 104 performs an edge extraction process on the captured image data, and then outputs edge image data and labeled image data as processed imaged data. The processed image data is supplied to the projective transformation unit 105 and the parking lane candidate vehicle computation unit 106. The projective transformation unit 105 performs a projective transformation process on the processed image data to transform an image captured with a perspective into an image viewed from straight above based on the parking lane information. The projective-transformed image data (edge image data and labeled image data) output from the projective transformation unit 105 is supplied to the parking lane candidate vehicle computation unit 106.

The parking lane candidate vehicle computation unit 106 detects a candidate parked vehicle in each parking lane 10D in the parking lot. In this case, the edge image data that has undergone projective transformation is used, and a candidate vehicle of the front lane is obtained in the A direction (see FIG. 13(a)). In addition, in this case, a candidate vehicle section of the rear lane is obtained in the B direction (see FIG. 14(c)) using the edge image data that has undergone projective transformation, a candidate vehicle section of the rear lane is obtained in the C direction (see FIG. 15(c)) using the edge image data that has not undergone projective transformation, the logical sum thereof is taken, and thereby a candidate vehicle of the rear lane is obtained.

The candidate vehicles of the front lane and the rear lane of each parking lane 10D obtained by the parking lane candidate vehicle computation unit 106 are supplied to the parking lane congestion degree computation unit 107. The parking lane congestion degree computation unit 107 computes the degree of parking lane congestion of each parking lane 10D based on the candidate vehicles of the front lane and the rear lane of each parking lane 10D and the parking lane information set by the parking lane information setting unit 101.

The degree of parking lane congestion of each parking lane 10D obtained by the parking lane congestion degree computation unit 107 is supplied to the parking lot congestion degree computation unit 109. The parking lot congestion degree computation unit 109 brings the degrees of parking lane congestion of all parking lanes 10D in the captured image together, and computes the degree of parking lot congestion of the entire parking lot. The degree of parking lot congestion is supplied to the congestion degree metadata transmission unit 110, and transmitted as metadata of the degree of parking lot congestion.

As described above, in the image processing device 100 illustrated in FIG. 1, it is determined whether or not vehicles are parked in the parking stalls 11 of the parking lanes 10D based on the edge image data generated by performing the edge extraction process on the captured image data. For this reason, the determination of whether or not vehicles are parked in the parking stalls 11 can be satisfactorily made, and therefore the degree of parking lane congestion and further the degree of parking lot congestion can be obtained with high accuracy.

2. Modified Example

In the embodiment described above, although the parking lot congestion degree computation unit 109 obtains the degree of congestion of an entire parking lot from the degrees of congestion of parking lanes, obtaining the degree of congestion of an entire parking lot by adding states of congestion of passages between parking lanes thereto is also considered.

In the case of a parking lot such as a service area, it may not be said that the parking lot is full even when all parking lanes are filled with vehicles. Since many vehicles make entries and exits at short intervals in such a service area, even if parking lanes are full, entry of vehicles into the parking lot is not prohibited. In such a case, the parking lot is determined as full only when vehicles fill the passages of the parking lot. For example, even when the degree of congestion of all parking lanes is 100%, the degree of congestion of the entire parking lot is not deemed to be 100%, and it is deemed to be 100% only when the passages are also full.

Figure 17:
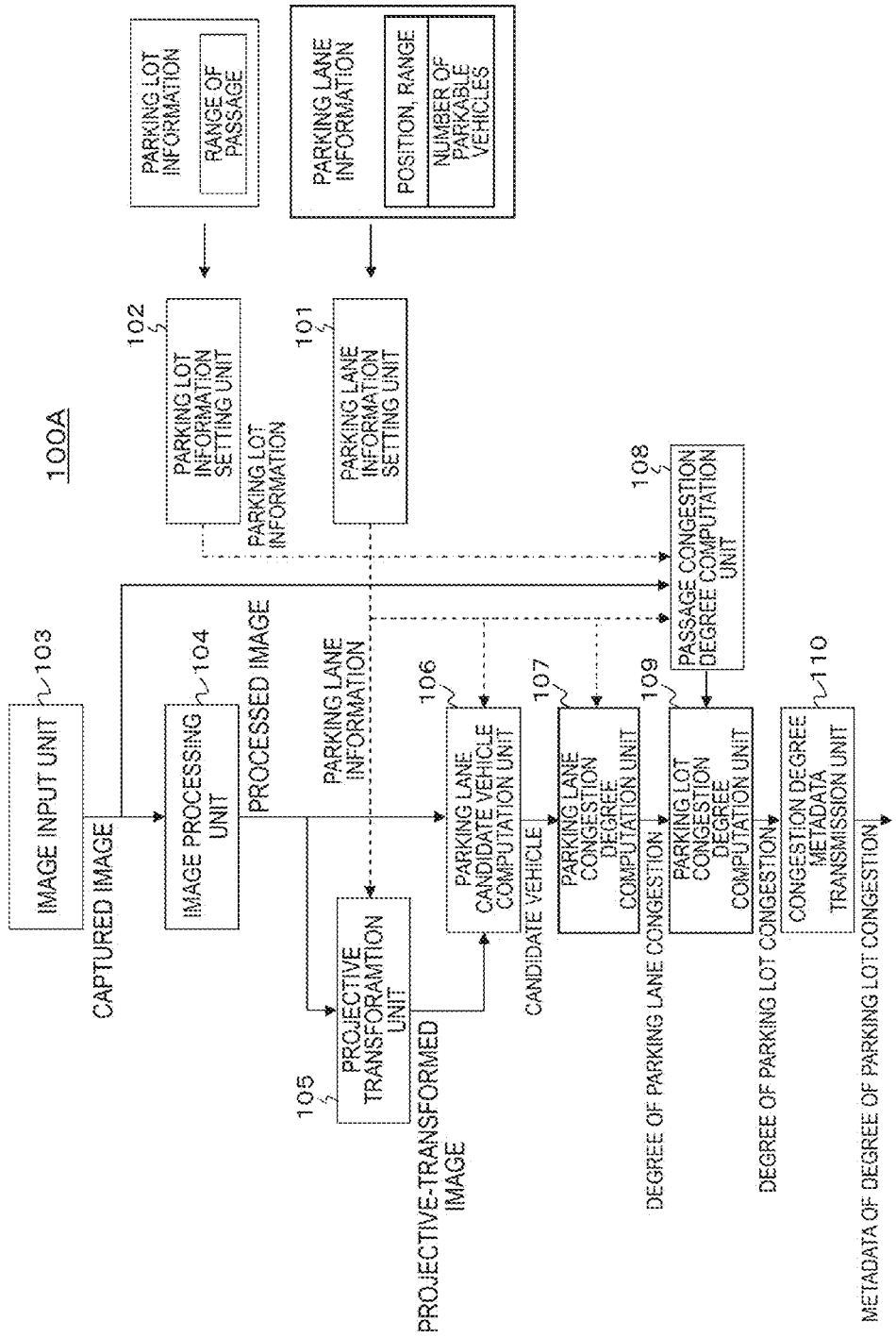
FIG. 17 is a block diagram illustrating a configuration example of another image processing device when the degree of congestion of an entire parking lot is obtained by adding a state of congestion of passages disposed between parking lanes thereto.

FIG. 17 illustrates a configuration example of an image processing device 100A when the degree of congestion of an entire parking lot is obtained by adding a state of congestion of passages disposed between parking lanes thereto. In FIG. 17, the same reference numerals are given to portions corresponding to those of FIG. 1, and detailed description thereof will be appropriately omitted.

The image processing device 100A has a parking lot information setting unit 102 and a passage congestion degree computation unit 108 in addition to the units of the image processing device 100 illustrated in FIG. 1. The parking lot information setting unit 102 sets parking lot information such as the range of passages, for example, according to a setting operation of parking lot information by a user. The parking lot information setting unit 102 supplies the set parking lot information to the passage congestion degree computation unit 108.

The passage congestion degree computation unit 108 performs, for example, a moving object detection process, or the like on captured image data, and thereby computes the degree of passage congestion. Then, in the image processing device 100A, the parking lot congestion degree computation unit 109 computes the degree of parking lot congestion with addition of the degree of passage congestion obtained by the passage congestion degree computation unit 108, in addition to the degree of congestion of each parking lane 10D obtained by the parking lane congestion degree computation unit 107.

Although detailed description is omitted, other configurations of the image processing device 100A are the same as those of the image processing device 100 illustrated in FIG. 1, and are operated in the same manner.

In addition, in the embodiment described above, the state of congestion of one parking lot is set to be transmitted, but using the present technology, the state of congestion of a plurality of parking lots can be collected at a center, and information thereof can be provided to users via a network.

Figure 18:
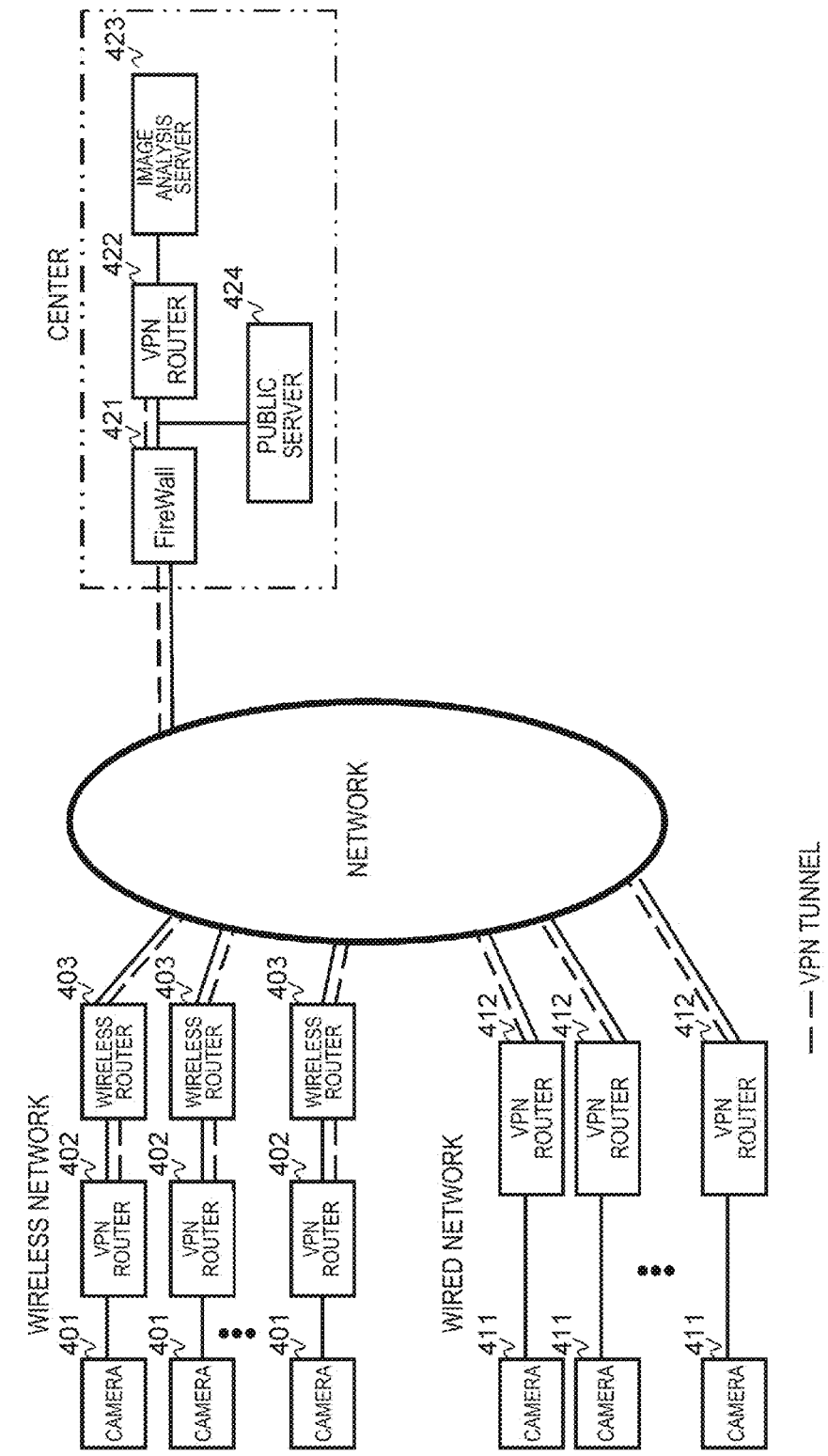
FIG. 18 is a block diagram illustrating a configuration example of an information providing system.

FIG. 18 illustrates a configuration example of an information providing system 400 in such a case. The information providing system 400 is configured to connect parking lots of various places and the center via a wireless or wired network. Here, when images are transferred via a general network, a VPN is used to prevent interception of the images. In addition, it is not necessary for a wired network to be prepared with sufficient bands, and a wireless network may be used to transfer images to parking lots in remote places.

A parking lot using a wireless network includes a camera 401, a VPN router 402, and a wireless router 403. In addition, a parking lot using a wired network includes a camera 411 and a VPN router 412. In addition, the center includes a firewall 421, a VPN router 422, an image analysis server 423, and a public server 424.

Images captured by the cameras 401 and 411 of the parking lots are transmitted to the center via the networks. In the center, the received images are analyzed by the image analysis server 423, and the degrees of congestion of the parking lots are computed in the same manner as in the embodiment described above. Then, the computed degrees of congestion of the parking lots are disclosed through the public server 424 using a web service.

By mounting a DSP, an FPGA, or the like in the cameras 401 and 411 of the parking lots, the cameras can possess the capability of computing the degree of congestion of the center described above. In this case, metadata of the degrees of congestion of the parking lots in addition to the images is transmitted from the cameras 401 and 411 to the center. In this case, the image analysis server 423 is not necessary for the center.

[Computer to which Present Disclosure is Applied]

The series of processes in the image processing apparatus described above can be executed by hardware or can be executed by software. In the case in which the series of processes is executed by the software, a program configuring the software is installed in a general-purpose computer.

Figure 19:
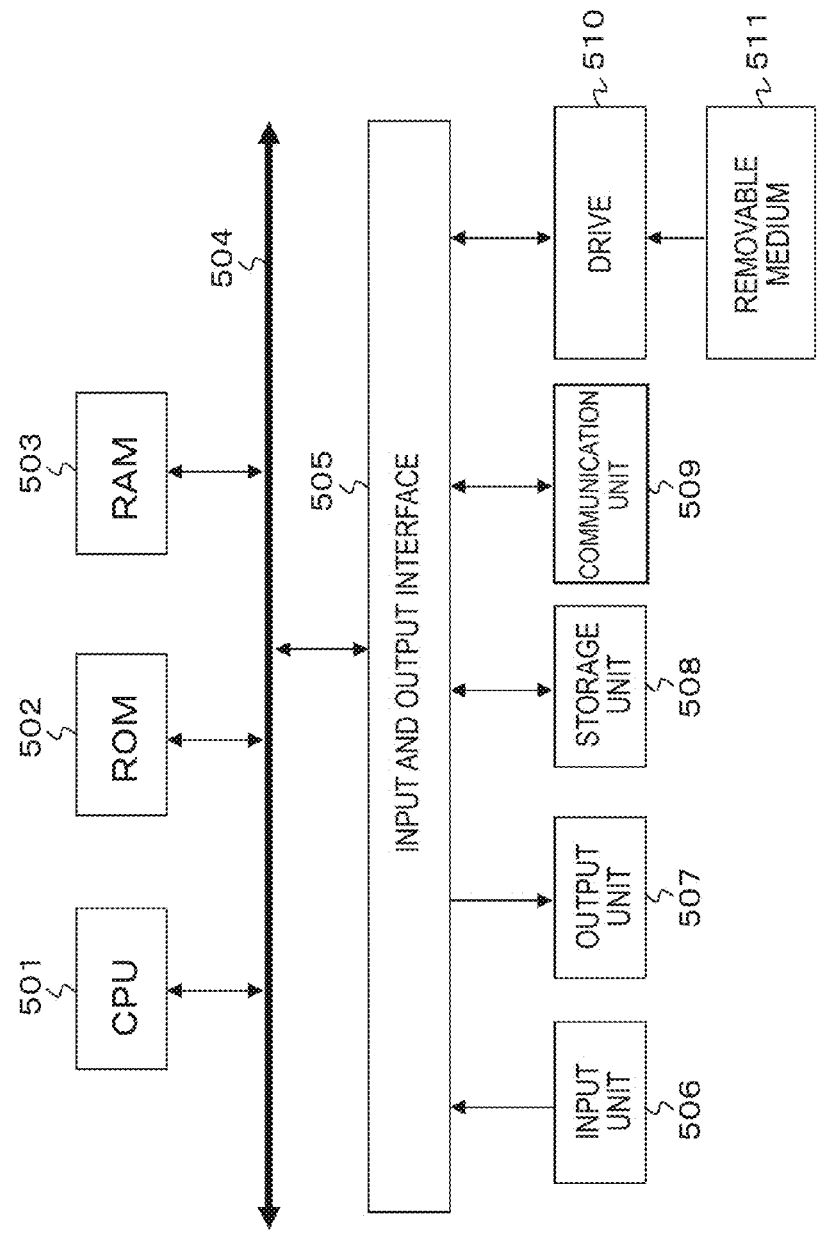
FIG. 19 is a block diagram illustrating a configuration example of a computer in which a program executing a series of processes of the image processing device is installed.
Figure 20:
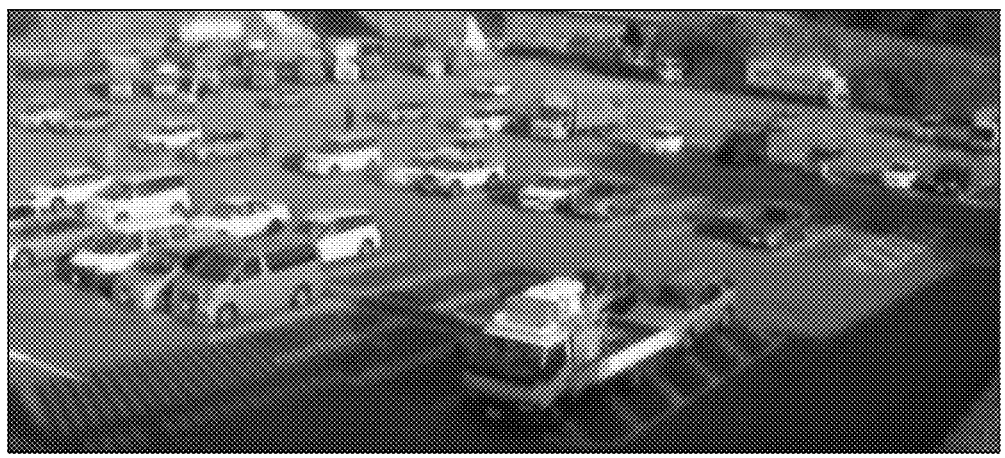
FIG. 20 is a diagram showing an example of a captured image of a parking lot such as a service area or a parking area of an expressway.

FIG. 19 illustrates a configuration example of the computer in which the program executing the series of processes is installed. The program can be previously recorded in a storage unit 508 or a read only memory (ROM) 502 functioning as a recording medium embedded in the computer.

The program can be stored (recorded) in a removable medium 511. The removable medium 511 can be provided as so-called package software. In this case, a flexible disc, a compact disc read only memory (CD-ROM), a magneto-optical (MO) disc, a digital versatile disc (DVD), a magnetic disc, and a semiconductor memory are exemplified as the removable medium 511.

The program can be installed from the removable medium 511 to the computer through a drive 510. In addition, the program can be downloaded to the computer through a communication network or a broadcasting network and can be installed in the embedded storage unit 508. That is, the program can be transmitted by wireless, from a download site to the computer through an artificial satellite for digital satellite broadcasting, or can be transmitted by wire, from the download site to the computer through a network such as a local area network (LAN) or the Internet.

The computer has a central processing unit (CPU) 501 embedded therein and an input/output interface 505 is connected to the CPU 501 through a bus 504. If a command is input to the CPU 501 through the input/output interface 505 by operating an input unit 506 by a user, the CPU 501 executes the program stored in the ROM 502, according to the command. The CPU 501 loads the program stored in the storage unit 508 to a random access memory (RAM) 503 and executes the program.

Thereby, the CPU 501 executes the series of processes executed by the configuration of the block diagram described above. In addition, the CPU 501 outputs the processing result from an output unit 507, transmits the processing result from a communication unit 509, or records the processing result in the storage unit 508, through the input/output interface 505, according to necessity. The input unit 506 is configured using a keyboard, a mouse, and a microphone. The output unit 507 is configured using a liquid crystal display (LCD) and a speaker.

The program may be processed by one computer (processor) or may be distributed to and processed by a plurality of computers. Alternatively, the program may be transmitted to a remote computer and may be executed by the remote computer.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing device including:

an image input unit configured to input captured image data of a portion of parking stalls that are compartmented at least by a first side line extending in a first direction and a second side line extending in the first direction;

an image processing unit configured to generate edge image data by performing an edge extraction process on the captured image data; and a parking determination unit configured to obtain an integrated value of edge pixels of the first direction portion corresponding to the parking stalls in each position of a second direction that is orthogonal to the first direction based on the edge image data, and then to determine whether or not vehicles are parked in the parking stalls based on the obtained integrated value of each position of the second direction.

(2) The image processing device according to (1), further including:

a projective transformation processing unit configured to perform a projective transformation process on the edge image data to transform an image captured with a perspective into an image viewed from straight above, wherein the parking determination unit obtains the integrated value of each position of the second direction based on the edge image data that has undergone the projective transformation process.

(3) The image processing device according to (1) or (2), wherein each of the parking stalls is compartmented by the first side line and the second side line and by a base line that is set to be on the opposite side of the entrance side and extends in the second direction, and wherein the first direction portion corresponding to each of the parking stalls is set to be in a range from the entrance of the parking stall to the front of the base line.

(4) The image processing device according to any one of (1) to (3), wherein the image processing unit has an edge extraction unit configured to generate edge intensity image data by performing an edge extraction process on the captured image data, a quantization unit configured to generate edge image data by performing a quantization process on the edge intensity image data, an edge labeling unit configured to regard edge pixel regions having connectivity with the edge image data as a same region, to perform a process of giving the same label number to edge pixels of a same region, and to generate labeled image data, a first rectangle objectification unit configured to perform a process of giving a circumscribed rectangle to the edge pixel regions to which the same label number is given based on the labeled image data, and to generate a rectangular object, and a first fine object removal unit configured to perform a process on the edge image data to remove an edge pixel region having a small number of connected pixels and an edge pixel region in a rectangular object having short vertical and horizontal widths as noise based on the labeled image data and the rectangular object, and to generate output edge image data.

(5) The image processing device according to (4), wherein the first fine object removal unit further performs a process on the labeled image data to remove the edge pixel region having a small number of connected pixels and the edge pixel region in the rectangular object having short vertical and horizontal widths as noise based on the labeled image data and the rectangular object, and to generate output labeled image data, wherein a projective transformation unit configured to perform a projective transformation process on the edge image data and the labeled image data that are output from the first fine object removal unit to transform an image captured with a perspective into an image viewed from straight above is further included,
 wherein the parking determination unit has
  a second rectangle objectification unit configured to generate a rectangular object by giving a circumscribed rectangle to the edge pixel regions to which the same label number is given based on the labeled image data output from the projective transformation unit, and
  a second fine object removal unit configured to perform a process on the edge image data output from the projective transformation unit to remove an edge pixel region that does not include an edge intensity equal to or greater than a predetermined value and an edge pixel region in a rectangular object having a width in the second direction smaller than a predetermined value as noise based on the labeled image data and the rectangular object, and to generate output edge image data, and
 wherein the integrated value of each position of the second direction is obtained based on the edge image data output from the second fine object removal unit.

(6) The image processing device according to any one of (1) to (5), for a parking lane that is constituted by consecutively providing a plurality of parking stalls in the second direction, the device further including:
 a parking lane congestion degree computation unit configured to compute the degree of congestion of vehicles in the parking lane based on a determination result made by the parking determination unit with regard to the plurality of parking stalls.

(7) The information processing device according to (6), for the parking lane that has a dual lane structure of a front lane and a rear lane,
 wherein, with regard to each of the parking stalls of the front lane, the parking determination unit obtains the integrated value of edge pixels of the first direction portion corresponding to the parking stalls in each position of the second direction that is orthogonal to the first direction based on the edge image data, and then determines whether or not vehicles are parked in the parking stalls based on the obtained integrated value of each position, and
 wherein, with regard to each of the parking stalls of the rear lane, the parking determination unit obtains, as a first integrated value, the integrated value of the edge pixels of the first direction portion corresponding to the parking stalls in each position of the second direction that is orthogonal to the first direction based on the edge image data, obtains, as a second integrated value, the integrated value of edge pixels of a third direction portion that is orthogonal to both of the first direction and the second direction corresponding to the entrances of the parking stalls in each position of the second direction based on the edge image data, and determines whether or not vehicles are parked in the parking stalls based on the obtained first and second integrated values of each position.

(8) The image processing device according to (7), further including:
 a projective transformation unit configured to perform a projective transformation process on the edge image data to transform an image captured with a perspective into an image viewed from straight above,
 wherein the parking determination unit obtains the integrated value based on the edge image data that has undergone the projective transformation process except for the second integrated value.

(9) An image processing method including:
 inputting captured image data of a portion of parking stalls that are compartmented at least by a first side line extending in a first direction and a second side line extending in the first direction;
 generating edge image data by performing an edge extraction process on the captured image data; and
 obtaining an integrated value of edge pixels of the first direction portion corresponding to the parking stalls in each position of a second direction that is orthogonal to the first direction based on the edge image data, and then determining whether or not vehicles are parked in the parking stalls based on the obtained integrated value of each position.

(10) A program for causing a computer to function as:
 a device configured to input captured image data of a portion of parking stalls that are compartmented at least by a first side line extending in a first direction and a second side line extending in the first direction;
 a device configured to generate edge image data by performing an edge extraction process on the captured image data; and
 a device configured to obtain an integrated value of edge pixels of the first direction portion corresponding to the parking stalls in each position of a second direction that is orthogonal to the first direction based on the edge image data, and then to determine whether or not vehicles are parked in the parking stalls based on the obtained integrated value of each position.

What is claimed is:
1. An image processing device, comprising:
at least one processor configured to:
 receive captured image data of a portion of parking stalls that are compartmented at least by a first side line extending in a first direction and a second side line extending in the first direction;
 generate edge image data by performing an edge extraction process on the captured image data, wherein, for performing the edge extraction process, the at least one processor is configured to:
  generate edge intensity image data by performing an edge extraction process on the captured image data;
  generate edge image data by performing a quantization process on the edge intensity image data;
  regard edge pixel regions having connectivity in the edge image data as a same region;
  perform a process of giving the same label number to edge pixels of a same region;
  generate labeled image data;
  perform a process of giving a circumscribed rectangle to the edge pixel regions to which the same label number is given based on the labeled image data;
  generate a rectangular object;
  perform a process on the edge image data to remove an edge pixel region having a small number of connected pixels and an edge pixel region in a rectangular object having short vertical and horizontal widths as noise based on the labeled image data and the rectangular object; and
  generate output edge image data;
 obtain an integrated value of edge pixels of a portion of the first direction corresponding to the parking stalls in each position of a second direction that is orthogonal to the first direction based on the edge image data; and
 determine whether or not vehicles are parked in the parking stalls based on the obtained integrated value of each position of the second direction.

2. The image processing device according to claim 1, wherein the at least one processor is further configured to:
perform a projective transformation process on the edge image data to transform an image captured with a perspective into an image viewed from straight above; and
obtain the integrated value of each position of the second direction based on the edge image data that has undergone the projective transformation process.

3. The image processing device according to claim 1, wherein each of the parking stalls is compartmented by the first side line and the second side line and by a base line that is set to be on the opposite side of an entrance side and extends in the second direction, and
wherein the first direction portion corresponding to each of the parking stalls is set to be in a range from an entrance of the parking stall to the front of the base line.

4. The image processing device according to claim 1, wherein the at least one processor is further configured to:
perform a process on the labeled image data to remove the edge pixel region having a small number of connected pixels and the edge pixel region in the rectangular object having short vertical and horizontal widths as noise based on the labeled image data and the rectangular object;
generate output labeled image data;
perform a projective transformation process on the edge image data and the labeled image data that are output from the first fine object removal unit to transform an image captured with a perspective into an image viewed from straight above;
generate a rectangular object by giving a circumscribed rectangle to the edge pixel regions to which the same label number is given based on the labeled image data output from the projective transformation unit;
perform a process on the edge image data output from the projective transformation unit to remove an edge pixel region that does not include an edge intensity equal to or greater than a predetermined value and an edge pixel region in a rectangular object having a width in the second direction smaller than a predetermined value as noise based on the labeled image data and the rectangular object; and
generate output edge image data;
wherein the integrated value of each position of the second direction is obtained based on the edge image data output from the second fine object removal unit.

5. The image processing device according to claim 1, for a parking lane that is constituted by consecutively providing a plurality of parking stalls in the second direction, the at least one processor being further configured to compute the degree of congestion of vehicles in the parking lane based on a determination result made with regard to the plurality of parking stalls.

6. An image processing device for operation with a parking lane that has a dual lane structure of a front lane and a rear lane, comprising:
at least one processor configured to:
receive captured image data of a portion of parking stalls that are compartmented at least by a first side line extending in a first direction and a second side line extending in the first direction;
generate edge image data by performing an edge extraction process on the captured image data;
obtain an integrated value of edge pixels of a portion of the first direction corresponding to the parking stalls in each position of a second direction that is orthogonal to the first direction based on the edge image data; and
determine whether or not vehicles are parked in the parking stalls based on the obtained integrated value of each position of the second direction;
wherein, with regard to each of the parking stalls of the front lane, the at least one processor is configured to obtain the integrated value of edge pixels of the portion of the first direction corresponding to the parking stalls in each position of the second direction that is orthogonal to the first direction based on the edge image data, and to determine whether or not vehicles are parked in the parking stalls based on the obtained integrated value of each position, and
wherein, with regard to each of the parking stalls of the rear lane, the at least one processor is configured to obtain, as a first integrated value, the integrated value of the edge pixels of the portion of the first direction corresponding to the parking stalls in each position of the second direction that is orthogonal to the first direction based on the edge image data, to obtain, as a second integrated value, the integrated value of edge pixels of a portion of a third direction that is orthogonal to both of the first direction and the second direction corresponding to the entrances of the parking stalls in each position of the second direction based on the edge image data, and to determine whether or not vehicles are parked in the parking stalls based on the obtained first and second integrated values of each position.

7. The image processing device according to claim 6, wherein the at least one processor is further configured to:
perform a projective transformation process on the edge image data to transform an image captured with a perspective into an image viewed from straight above; and
obtain the integrated value based on the edge image data that has undergone the projective transformation process except for the second integrated value.

8. An image processing method comprising:
receiving captured image data of a portion of parking stalls that are compartmented at least by a first side line extending in a first direction and a second side line extending in the first direction;
generating edge image data by performing an edge extraction process on the captured image data, the edge extraction process comprising:
generating edge intensity image data by performing an edge extraction process on the captured image data;
generating edge image data by performing a quantization process on the edge intensity image data;
regarding edge pixel regions having connectivity in the edge image data as a same region;
performing a process of giving the same label number to edge pixels of a same region;
generating labeled image data;
performing a process of giving a circumscribed rectangle to the edge pixel regions to which the same label number is given based on the labeled image data;
generating a rectangular object;
performing a process on the edge image data to remove an edge pixel region having a small number of connected pixels and an edge pixel region in a rectangular object having short vertical and horizontal widths as noise based on the labeled image data and the rectangular object; and
generating output edge image data;
obtaining an integrated value of edge pixels of a portion of the first direction corresponding to the parking stalls in each position of a second direction that is orthogonal to the first direction based on the edge image data; and determining whether or not vehicles are parked in the parking stalls based on the obtained integrated value of each position.

9. A non-transitory computer-readable medium encoded with instructions that, when executed by a computer, cause the computer to:
- receive captured image data of a portion of parking stalls that are compartmented at least by a first side line extending in a first direction and a second side line extending in the first direction;
- generate edge image data by performing an edge extraction process on the captured image data, the edge extraction process comprising:
  - generating edge intensity image data by performing an edge extraction process on the captured image data;
  - generating edge image data by performing a quantization process on the edge intensity image data;
  - regarding edge pixel regions having connectivity in the edge image data as a same region;
  - performing a process of giving the same label number to edge pixels of a same region;
  - generating labeled image data;
  - performing a process of giving a circumscribed rectangle to the edge pixel regions to which the same label number is given based on the labeled image data;
  - generating a rectangular object;
  - performing a process on the edge image data to remove an edge pixel region having a small number of connected pixels and an edge pixel region in a rectangular object having short vertical and horizontal widths as noise based on the labeled image data and the rectangular object; and
  - generating output edge image data;
- obtain an integrated value of edge pixels of a portion of the first direction corresponding to the parking stalls in each position of a second direction that is orthogonal to the first direction based on the edge image data; and
- determine whether or not vehicles are parked in the parking stalls based on the obtained integrated value of each position.

10. An image processing method for use with a parking lane that has a dual lane structure of a front lane and a rear lane, comprising:
- receiving captured image data of a portion of parking stalls that are compartmented at least by a first side line extending in a first direction and a second side line extending in the first direction;
- generating edge image data by performing an edge extraction process on the captured image data;
- obtaining an integrated value of edge pixels of a portion of the first direction corresponding to the parking stalls in each position of a second direction that is orthogonal to the first direction based on the edge image data; and
- determining whether or not vehicles are parked in the parking stalls based on the obtained integrated value of each position;
- wherein, with regard to each of the parking stalls of the front lane, the integrated value of edge pixels of the portion of the first direction corresponding to the parking stalls in each position of the second direction that is orthogonal to the first direction is obtained based on the edge image data, and whether or not vehicles are parked in the parking stalls is determined based on the obtained integrated value of each position, and
- wherein, with regard to each of the parking stalls of the rear lane, as a first integrated value, the integrated value of the edge pixels of the portion of the first direction corresponding to the parking stalls in each position of the second direction that is orthogonal to the first direction is obtained based on the edge image data, as a second integrated value, the integrated value of edge pixels of a portion of a third direction that is orthogonal to both of the first direction and the second direction corresponding to the entrances of the parking stalls in each position of the second direction is obtained based on the edge image data, and whether or not vehicles are parked in the parking stalls is determined based on the obtained first and second integrated values of each position.

11. A non-transitory computer-readable medium for use with a parking lane that has a dual lane structure of a front lane and a rear lane, the computer-readable medium being encoded with instructions that, when executed by a computer, cause the computer to:
- receive captured image data of a portion of parking stalls that are compartmented at least by a first side line extending in a first direction and a second side line extending in the first direction;
- generate edge image data by performing an edge extraction process on the captured image data;
- obtain an integrated value of edge pixels of a portion of the first direction corresponding to the parking stalls in each position of a second direction that is orthogonal to the first direction based on the edge image data; and
- determine whether or not vehicles are parked in the parking stalls based on the obtained integrated value of each position;
- wherein, with regard to each of the parking stalls of the front lane, the integrated value of edge pixels of the portion of the first direction corresponding to the parking stalls in each position of the second direction that is orthogonal to the first direction is obtained based on the edge image data, and whether or not vehicles are parked in the parking stalls is determined based on the obtained integrated value of each position, and
- wherein, with regard to each of the parking stalls of the rear lane, as a first integrated value, the integrated value of the edge pixels of the portion of the first direction corresponding to the parking stalls in each position of the second direction that is orthogonal to the first direction is obtained based on the edge image data, as a second integrated value, the integrated value of edge pixels of a portion of a third direction that is orthogonal to both of the first direction and the second direction corresponding to the entrances of the parking stalls in each position of the second direction is obtained based on the edge image data, and whether or not vehicles are parked in the parking stalls is determined based on the obtained first and second integrated values of each position.

* * * * *